United States Patent [19]

Shiraishi et al.

[11] Patent Number: 5,260,249
[45] Date of Patent: Nov. 9, 1993

[54] CATALYST FOR PURIFYING AUTOMOTIVE EXHAUST GAS

[75] Inventors: Eiichi Shiraishi; Hideyuki Baba; Kazuo Tsuchitani; Tomohisa Ohata, all of Himeji, Japan

[73] Assignee: Nippon Shokubai, Co., Ltd., Osaka, Japan

[21] Appl. No.: 862,967

[22] Filed: Apr. 3, 1992

[30] Foreign Application Priority Data

| Apr. 5, 1991 | [JP] | Japan | 3-72978 |
|---|---|---|---|
| Jun. 10, 1991 | [JP] | Japan | 3-138043 |
| Jul. 22, 1991 | [JP] | Japan | 3-180861 |
| Aug. 13, 1991 | [JP] | Japan | 3-202751 |
| Aug. 13, 1991 | [JP] | Japan | 3-202752 |
| Sep. 10, 1991 | [JP] | Japan | 3-230270 |
| Sep. 13, 1991 | [JP] | Japan | 3-234724 |
| Nov. 27, 1991 | [JP] | Japan | 3-312266 |
| Feb. 4, 1992 | [JP] | Japan | 4-18754 |
| Feb. 7, 1992 | [JP] | Japan | 4-22792 |

[51] Int. Cl.$^5$ .......... B01J 23/58; B01J 23/10; B01J 21/04; B01J 21/06
[52] U.S. Cl. .......... 502/304; 423/213.5
[58] Field of Search .......... 502/242, 304; 423/213.5

[56] References Cited

U.S. PATENT DOCUMENTS

| 4,492,769 | 1/1985 | Blanchard et al. | 502/304 X |
|---|---|---|---|
| 4,581,343 | 4/1986 | Blanchard et al. | 502/304 X |
| 4,624,940 | 11/1986 | Wan et al. | 423/213.5 X |
| 4,714,694 | 12/1987 | Wan et al. | 502/304 |
| 4,857,499 | 8/1989 | Ito et al. | 502/304 X |
| 4,931,419 | 6/1990 | Blanchard et al. | 502/304 |
| 5,045,521 | 9/1991 | Lox et al. | 502/304 |
| 5,057,483 | 10/1991 | Wan | 502/304 |
| 5,075,276 | 12/1991 | Ozawa et al. | 502/304 |
| 5,102,853 | 4/1992 | Chattha et al. | 423/213.5 X |
| 5,202,300 | 4/1993 | Funabiki et al. | 502/304 |

FOREIGN PATENT DOCUMENTS

| 0329302 | 8/1989 | European Pat. Off. | 502/304 |
|---|---|---|---|
| 60-054730 | 3/1985 | Japan . | |
| 1-067256 | 3/1989 | Japan . | |
| 57-153737 | 9/1992 | Japan . | |

Primary Examiner—W. J. Shine
Assistant Examiner—Douglas J. McGinty
Attorney, Agent, or Firm—Omri M. Behr; Matthew J. McDonald

[57] ABSTRACT

An exhaust gas purifying catalyst for simultaneous removal of carbon monoxide, hydrocarbons and nitrogen oxides from an exhaust gas from an internal-combustion engine, having carried on a monolithic carrier a mixture comprising a catalytically active component comprising 0.5 to 30 g of palladium, 0.1 to 50 l g of an alkaine earth metal oxide, 10 go 150 g of cerium oxide, and 0.1 to 50 g of zirconium oxide and 10 to 300 g of an activated alumina.

14 Claims, No Drawings

CATALYST FOR PURIFYING AUTOMOTIVE EXHAUST GAS

BACKGROUND OF THE INVENTION

1. Field of the Invention

This invention relates to a catalyst for purifying an exhaust gas and an exhaust gas purifying system. More particularly, it relates to an exhaust gas purifying catalyst for simultaneously divesting the exhaust gas from the internal-combustion engine such as on an automobile of such noxious components as carbon monoxide (CO), hydrocarbons (HC), and nitrogen oxides (NOx) and an exhaust gas purifying system.

2. Description of the Prior Art

Various inventions have been proposed concerning exhaust gas purifying catalysts capable of removing noxious components from the exhaust gas which issues from the internal-combustion engine.

Heretofore, it has been universally known that palladium catalysts possess high heat-resistance and exhibit great purifying ability to the CO and HC in the oxidizing atmosphere [the so-called lean portion in which the air fraction is larger in the air/fuel mixture (A/F)] of the exhaust gas from the engine. They nevertheless have the disadvantage that they are deficient in the NOx purifying ability in the reducing atmosphere [the so-called rich portion in which the fuel fraction is larger in the air/fuel mixture (A/F)] of the engine exhaust gas. Thus, the palladium catalysts are used only on the lean side of the atmosphere in the form of a so-called oxidizing catalyst. Otherwise, they are used in the form of a three-way catalyst combining the palladium with rhodium, a substance possessing great NOx purifying ability, and effecting simultaneous removal of CO, HC, and NOx.

Since rhodium is very expensive, a desire has been expressed in the industry to decrease the amount of rhodium to be used as a catalyst component or avoid completely the use of rhodium as such. Since rhodium is characterized by possessing great NOx purifying ability, however, it constitutes itself an indispensable component for an exhaust gas purifying catalyst to be used for simultaneous removal of carbon monoxide (CO), hydrocarbons (HC), and nitrogen oxides (NOx).

An object of this invention, therefore, is to provide a novel exhaust gas purifying catalyst and an exhaust gas purifying system.

Another object of this invention is to provide an exhaust gas purifying catalyst capable of simultaneously removing the three components, CO, HC, and NOx, at an extremely small application rate without requiring use of rhodium and an exhaust gas purifying system.

SUMMARY OF THE INVENTION

These objects are accomplished by an exhaust gas purifying catalyst for simultaneous removal of carbon monoxide, hydrocarbons and nitrogen oxides from the exhaust gas of the internal-combustion engine, which catalyst is obtained by depositing on a monolithic carrier a mixture comprising a catalytically active component comprising 0.5 to 30 g of palladium, 0.1 to 50 g of an alkaline earth metal oxide, 10 to 150 g of cerium oxide, and 0.1 to 50 g of zirconium oxide and 10 to 300 g of an activated alumnina per liter of the catalyst.

These objects are further accomplished by an exhaust gas purifying system using on the exhaust gas inlet side thereof a catalyst obtained by depositing on a monolithic carrier a mixture comprising a catalytically active component comprising 0.5 to 30 g of palladium, 0.2 to 50 g of an alkaline earth metal oxide, 10 to 150 g of cerium oxide, and 0.1 to 50 g of zirconium oxide and 10 to 300 g of a refractory inorganic oxide activated alumina per liter of the catalyst and on the exhaust gas outlet side thereof a catalyst obtained by depositing on a monolithic carrier a mixture comprising a catalytically active component comprising (a) rhodium and platinum or (b) rhodium, platinum, and palladium and the refractory inorganic oxide.

These objects are also accomplished by an exhaust gas purifying system using on the exhaust gas inlet side thereof a catalyst obtained by depositing on monolithic carrier a mixture comprising a catalytically active component comprising (a) rhodium and platinum or (b) rhodium, platinum, and palladium and the refractory inorganic oxide and on the exhaust gas outlet side thereof a catalyst obtained by depositing on a monolithic carrier a mixture comprising a catalytically active component comrising 0.5 to 30 g of palladium, 0.1 to 50 g of an alkaline earth metal oxide, 10 to 150 g of cerium oxide, and 0.1 to 50 g of zirconium oxide and 10 to 300 g of an activated alumina per liter of the catalyst.

EXPLANATION OF THE PREFERRED EMBODIMENT

The exhaust gas purifying catalyst according to this invention is produced by depositing on a a monolithic carrier a mixture which comprises a catalytically active component consisting of palladium, an alkaline earth metal oxide, a cerium oxide, and zirconium oxide and an activated alumina.

It is suspected that the addition of an alkaline earth metal oxide is effective in heightening the reactivity of the catalytically active component by the added oxide directly acting on palladium and varying the state of electric charge thereof. This effect of the alkaline earth metal oxide is further enhanced by the use of a cerium oxide and a zirconium oxide. Further, heat resistance and purifying ratio of crossover point increase by increasing the amount of these oxides.

This invention has originated in a knowledge that the combination of palladium with an alkaline earth metal oxide, a cerium oxide, and a zirconium oxide not only brings about a notable improvement in the palladium catalyst's NOx purifying ability otherwise manifested insufficiently on the rich side of the engine exhaust gas but also improves the catalyst's ability to purge the exhaust gas of CO, HC, and NOx even when the fuel gas composition closely approximates the stoichiometric ratio (containing air in an amount required for complete combustion of the fuel gas). This invention has been perfected as a result.

The amount of palladium to be used in the catalyst of this invention, though variable with the conditions under which the catalyst is used, generally is in the range of from 0.5 to 30 g, preferably from 0.5 to 25 g, per liter of the catalyst. If the amount of palladium is less than 0.5 g, the produced catalyst is deficient in the purifying ability. Conversely, if this amount exceeds 30 g, the excess brings about no proportionate addition to the performance of the produced catalyst.

The position for the deposition of palladium is variable with the amount of palladium to be used and the conditions under which the produced catalyst is used. The palladium is deposited either selectively or otherwise on the zirconium oxide, the cerium oxide, and the activated alumina.

The alkaline earth metals which are effectively usable herein include beryllium, magnesium, calcium, strontium, and barium. Particularly, at least one element selected from the group consisting of calcium, strontium, and barium proves preferable. The amount of the alkaline earth metal oxide to be used is in the range of from 0.1 to 50 g, preferably from 0.5 to 40 g, per liter of the catalyst. Since the alkaline earth metal salt can be deposited on any of the cerium oxide, zirconium oxide, composite thereof, and solid solution thereof, and an activated alumina, the method to be used for the preparation of this alkaline earth metal salt is not particularly limited.

The precursor of the alkaline earth metal oxide may be an oxide, an organic salt, or an inorganic salt. This invention does not particularly discriminate the alkaline earth metal oxide on account of its precursor. Typical examples of the precursor are barium acetate, barium oxalate, barium nitrate, barium hydroxide, and barium carbonate. As respects the state of aggregation of this precursor, the precursor may be in the form of an aqueous solution, a gel, a suspension, or a solid.

The weight ratio of the alkaline earth metal to palladium is in the range of from 1 100: to 150: 1, (alkaline earch metal oxide/palladium from 1:100 to 100:1, and more preferably from 1:100 to 80:1. If the amount of the alkaline earth metal oxide is smaller than 1:100, the produced catalyst is deficient in three way performance, particularly the purifying ratio of NO. If the amount of the alkaline earth metal oxide exceeds 150:1, though the excess goes to improving the effect of addition of this oxide, it imposes a limit on the ratios and amounts of other oxides to be deposited on account of the relation between the amounts of other oxides to be deposited and the strength of the catalyst.

The cerium oxide is not particularly discriminated by the origin thereof. To be used herein, it may be already in the form of an oxide or it may be prepared in the form of an oxide by calcining a varying water-soluble salt of cerium. The amount of the cerium oxide to be used is in the range of from 10 to 150 g, preferably from 20 to 140 g, per liter of the catalyst. If this amount is less than 10 g, the produced catalyst is deficient in the purifying ability. Conversely, if the amount exceeds 150 g, the excess brings about no proportionate addition to the effect thereof.

The cerium oxide source to be used in this invention is not discriminated on account of the kind of starting material so long as it is allowed to exist as cerium dioxide ($CeO_2$) in the catalyst. For example, $CeO_2$, cerium carbonate, and cerium hydroxide which are available in the market can be used. A cerium salt solution such as, for example, an aqueous cerium nitrate solution may be deposited by impregnation on the activated alumina. The water-insoluble cerium compounds which are effectively usable herein include cerium oxide, cerium hydroxide, and cerium carbonate. The water-insoluble cerium compound is used in the form of a fine powder.

The zirconium oxide is not particularly discriminated on account of the kind of its starting material. To be used herein, it may be already in the form of an oxide or it may be prepared in the form of zirconium oxide by calcining a varying water-soluble zirconium salt. The amount of the zirconium oxide to be used is in the range of from 0.1 to 50 g, preferably from 1 to 50 g, per liter of the catalyst. If this amount is less than 0.1 g, the added zirconium oxide manifests no sufficient effect. If the amount exceeds 50 g, the excess goes only to impairing the purifying ability of the produced catalyst.

The cerium oxide and zirconium oxide are preferable to have at least part thereof exist in the form of a composite or a solid solution in the catalyst. The ratio (weight ratio as oxide) of the cerium oxide to the zirconium oxide is in the range of from 100 2 to 100 60, preferably from 100:4 to 100:40. If the proportion of the cerium oxide is larger than 100:2, the excess impairs the produced catalyst in performance. If the proportion of the zirconium oxide is larger than 100:60, the excess tends to degrade the performance of the produced catalyst.

The methods which are available for the preparation of the composite or solid solution of the cerium oxide and zirconium oxide are enumerated below. Though these methods are not particularly discriminated so long as they are capable of enabling at least part of the oxides to exist in the form of a composite or solid solution in the catalyst, they are preferable to allow the oxides to satisfy the weight ratio defined above.

Specifically, (1) a method which comprises drying an aqueous solution of water-soluble cerium salt and zirconium salt and calcining the resultant dried composite, (2) a method which comprises subjecting a cerium oxide and a zirconium oxide to a solid-phase reaction, (3) a method which comprises impregnating a cerium oxide with the aqueous solution of a water-soluble zirconium salt and drying and calcining the resultant product of impregnation, (4) a method which comprises impregnating an activated alumina with the aqueous solution of water-soluble cerium salt and zirconium salt and drying the calcining the resultant product of impregnation, and (5) a method which comprises coating a monolithic carrier with an activated alumina oxide, impregnating the coated carrier with the aqueous solution of water-soluble cerium salt and zirconium salt, and drying and calcining the resultant product of impregnation are typical examples. One of these methods may be properly selected in due consideration of the suitability thereof to the particular manner of preparation of the catalyst being contemplated.

The cerium oxide to be used in this invention is required to be such that it forms crystals not more than 250Å in diameter after it has been calcined in the air at 900° C. for 10 hours. The cerium oxide which satisfies this requirement possesses thermal stability and serves to improve the durability of the catalyst. If the crystals have diameters exceeding 250Å the cerium oxide is deficient in thermal stability. The diameters of these crystals are determined by combining the cerium oxide and zirconium oxide so as to prepare a powder at least part of which is in the form of a composite or solid solution thereof or optionally preparing a catalyst, then firing the powder or the catalyst in the air at 900° C. for 10 hours, subjecting a sample of the product of calcination to X-ray diffraction analysis thereby obtaining an X-ray diffraction chart, and performing a calculation using the half-value widths found in the chart.

The combination of the cerium oxide and zirconium oxide at least part of which forms a composite or solid solution, after 10 hours calcination firing in the air at 900° C. and 30 minutes reduction with hydrogen at 500° C., is preferable to exhibit an oxygen consumption at 400° C. in the range of not less than $5 \times 10^{-5}$ mol (calculated as $O_2$) per g of the cerium oxide. If the oxygen consumption is less than $5 \times 10^{31\ 5}$ mol (calculated as $O_2$)

per g of the cerium oxide, the produced catalyst is deficient in durability.

The determination of the oxygen consumption is performed with an ordinary flow type pulse reaction device by calcinating in the air at 900° C. for 10 hours the combination of the cerium oxide and zirconium oxide at least part of which is in the form of a composite or solid solution, packing the device with a prescribed amount of the resultant powder, sweeping the powder with an inert gas, then reducing the powder with hydrogen at 500° C. for 30 minutes, again sweeping the reduced powder with the inert gas, cooling the hot powder to 400° C., passing pulses of oxygen through the powder, measuring the amount of oxygen consumed during the passage, and calculating the oxygen consumption per g of the cerium oxide based on the result of the measurement.

The activated alumina is generally in a powdery form. These particles have a specific surface area in the range of from 10 to 400 $m^2/g$, preferably from 50 to 300 $m^2/g$. The amount to be used is 10 to 300 g preferably 50 to 250 g per liter of the catalyst. That is, if it is less than 10 g, purifying performance is insufficient, and if it is more than 300 g, back pressure of the catalyst increases, so it is not preferable. The activated alumina means irregular alumina having crystal form such as $\chi$, $\rho$, $\kappa$, $\gamma$, $\delta$, $\eta$ or $\theta$ form.

In this invention, the aforementioned catalytically active component comprising palladium, an alkaline earth metal oxide, a cerium oxide, and a zirconium oxide may further incorporate therein a lanthanum oxide. This addition improves the result of the use of the catalyst.

The lanthanum oxide is not particularly discriminated on account of the particular kind of its starting material. Either lanthanum oxide or a varying water-soluble salt of lanthanum can be deposited either selectively or otherwise on an activated alumina, the cerium oxide, and the zirconium oxide.

The amount of the lanthanum oxide to be used is in the range of from 0.1 to 50 g, preferably from 0.5 to 30 g per liter of the catalyst. If this amount is less than 0.1 g, the added lanthanum oxide produces only an insufficient effect. Conversely, if the amount exceeds 50 g, the excess brings about no proportionate addition to the effect.

In this case, the catalytic component which comprises (a) palladium and an alkaline earth metal oxide, (b) a cerium oxide having zirconium and lanthanum deposited thereon, and (c) an actvated alumina having cerium and zirconium deposited thereon is preferable to be deposited on a carrier of a monolithic structure.

The position for the deposition of palladium is variable with the amount of palladium to be used and the conditions under which the catalyst is used. The palladium is deposited either selectively or otherwise on the zirconium oxide, cerium oxide, and lanthanum oxide, and on an activated alumina.

The zirconium and lanthanum can be used in the form of water-soluble salts such as nitrate and sulfate, in the form of a gel, or in the form of a suspended solution, for example.

For the preparation of the cerium oxide having zirconium and lanthanum deposited thereon, (1) a method which comprises simultaneously impregnating the cerium oxide with the aqueous solution of the zirconium salt and lanthanum salt mentioned above and drying and calcining the resultant product of impregnation, (2) a method which comprises impregnating the cerium oxide first with the aqueous solution of a zirconium salt and then with the aqueous solution of a lanthanum salt thereby depositing the salts on the cerium oxide, and (3) a method which comprises impregnating the cerium oxide first with the aqueous solution of a lanthanum salt and then with the aqueous solution of a zirconium salt thereby depositing the salts on the cerium oxide are available. One of these methods may be properly selected for the preparation under discussion.

The zirconium which is thus deposited on the cerium oxide is preferable to have at least part thereof form a composite or solid solution in conjunction with the cerium oxide and/or lanthanum oxide.

The ratio (weight ratio as oxide) of the cerium oxide having zirconium and lanthanum deposited thereon to the cerium contained in the activated alumina having cerium and zirconium deposited thereon is preferable to be in the range of from 100:1 to 10:100, preferably from 100:5 to 10:100. If the proportion of the cerium oxide is larger than 100:1, the produced catalyst betrays a decline in the NOx purifying ability on the rich side. Conversely, if the proportion of the cerium in the refractory inorganic oxide is larger than 10:100, the produced catalyst tends to be deficient in performance.

In this invention, the catalytically active component which comprises of palladium, an alkaline earth metal oxide, a cerium oxide, and a zirconium oxide may further incorporate therein at least one member selected from the group consisting of silicon oxides and titanium oxides for the purpose of producing an improved result.

The titanium oxide source is not particularly discriminated on account of the particular kind of its starting material. To be used herein, it may be already in the form of an oxide or it may be in the form of a water-soluble or water-insoluble salt which is converted by calcining into an oxide.

Further, the titanium oxide may be used as combined with the oxide of at least one element selected from the group consisting of silicon, zirconium, cerium, alkaline earth metals, and aluminum.

The amount of the titanium oxide to be used is in the range of from 1 to 150 g, preferably 5 to 100 g, per liter of the catalyst. If this amount is less than 1 g, the effect produced by the added titanium oxide is short of the level aimed at. Conversely, if the amount exceeds 150 g, the excess brings about no proportionate addition to the effect.

The use of the titanium oxide for the purpose mentioned above can be attained by various methods such as, for example, (1) a method which comprises mixing the titanium oxide itself with the other constituents of the catalytically active component, (2) a method which comprises impregnating an activated alumina with an aqueous solution of titanium thereby effecting deposition of titanium oxide on the refractory inorganic oxide, (3) a method which comprises impregnating either or both of the cerium oxide and zirconium oxide or a composite of the two oxides with an aqueous solution of titanium thereby effecting deposition of titanium oxide thereon, and (4) a method which comprises mixing the aqueous solution of titanium with the aqueous solution of an alkaline earth metal oxide and drying and calcining the resultant mixture thereby producing a mixture or composite.

The silicon oxide source is not specifically discriminated. For example, oxide sol and various water-soluble salts which are enabled by firing to form silica can be used. The use of the silicon oxide is attained by causing the aqueous solution mentioned above to be deposited either selectively or otherwise on the activated alumina and on the titanium oxide, cerium oxide, and zirconium oxide. The amount of the silicon oxide to be used is in the range of from 0.05 to 50 g, preferably from 0.1 to 30 g, per liter of the catalyst. If this amount is less than 0.05 g, the effect of the addition of the silicon oxide is not obtained. Conversely, if the amount exceeds 50 g, the excess brings about no proportionate addition to the effect.

In this invention, the catalytically active component which comprises palladium, an alkaline earth metal oxide, a cerium oxide, and a zirconium oxide may further incorporate therein the oxide of at least one element selected from the group consisting of iron, cobalt, and nickel for the purpose of further improving the result of use of the produced catalyst.

The oxide of at least one element selected from the group of iron, cobalt, and nickel is not particularly discriminated. An oxide sol or water-soluble salt suitably selected from the members defined above is deposited either selectively or otherwise on the activated alumina or the cerium oxide or zirconium oxide. The amount of the oxide to be used is in the range of from 0.1 to 20 g, preferably from 0.5 to 10 g, per liter of the catalyst. If this amount is less than 0.1 g, the added oxide fails to manifest the effect aimed at. Conversely, if the amount exceeds 20 g, the excess goes to impairing the purifying ability of the produced catalyst.

The preparation of the catalyst is attained by various methods such as, for example, (1) a method which comprises mixing a catalytically active component and an activated alumina in respective whole amounts such as in a ball mill thereby forming an aqueous slurry, coating a monolithic carrier with the aqueous slurry, then drying the resultant wet composite, and optionally calcining the dry composite thereby producing a complete catalyst, (2) a method which comprises preparatorily coating a monolithic carrier with an activated alumina, immersing the coated carrier in the aqueous solution of water-soluble cerium salt and zirconium salt, drying and calcining the impregnated carrier, and subsequently effecting deposition of a catalytically active component on the calcined composite by following the same procedure as above, and (3) a method which comprises mixing a composite oxide and an activated alumina having necessary components deposited thereon such as in a ball mill thereby forming an aqueous slurry, coating a monolithic carrier with the aqueous slurry, then drying the resultant wet composite, and optionally calcining the dried composite thereby producing a complete catalyst. One of these methods may be properly selected and used with necessary modifications to be made with due consideration to the convenience of procedure.

The amount of the catalytically active component to be used per liter of the monolithic carrier is in the range of from 50 to 400 g, preferably from 100 to 350 g. If this amount is less than 50 g, the produced catalyst is deficient in the purifying ability. Conversely, if the amount exceeds 400 g, the disadvantage arises that the back pressure generated when the monolithic carrier is coated with the catalytically active component is suffered to increase to an unduly high level.

The incorporation of the lanthanum oxide in the catalytically active component can be attained by various methods such as, for example, (1) a method which comprises impregnating an activated alumina simultaneously with water-soluble cerium and zirconium salts, drying the resultant wet composite, and calcining the dried composite, (2) a method which comprises impregnating an activated alumina with a water-soluble cerium salt thereby effecting deposition of the cerium salt on the oxide and then impregnating the resultant composite with a water-soluble zirconium salt thereby effecting deposition of the salt on the composite, and (3) a method which comprises impregnating an activated alumina with a water-soluble zirconium salt thereby effecting deposition of the salt on the oxide and then impregnating the resultant composite with a water-soluble cerium salt thereby effecting deposition of the salt on the composite.

The carrier possessing a monolithic structure and used in this invention is generally referred to as a "ceramic honeycomb carrier." Particularly, honeycomb carriers made of such materials as cordierite, mullite, α-alumina, zirconia, titania, titanium phosphate, aluminum titanate, petalite, spodumene, alumino-silicate, and magnesium silicate prove preferable. The honeycomb carrier made of cordierite among other ceramic materials proves especially suitable for the catalyst intended for the exhaust gas from the internal-combustion engine. A carrier formed in one-piece structure of such a metal as stainless steel or a Fe-Cr-Al alloy which is resistant to oxidation and proof against heat can be used. The monolithic carrier is manufactured by the extrusion molding technique or a method which comprises winding a sheet-like material into a tight roll. The mouths for gas passage (cells) of the honeycomb carrier may be shaped in a hexagonal, tetragonal, triangular, or corrugated cross section. The honeycomb carrier fulfils its function with amply satisfactory results when it has a cell density (number of cells/unit cross sectional area) in the range of from 150 to 600 cells/square inch.

The monolithic carrier which is coated with the catalytically active component and an activated alumina, after the step of drying, is preferable to be calcined at a temperature in the range of from 200° to 800° C., preferably from 300° to 700° C., for a period in the range of from 0.1 to 5 hours, preferably from 0.2 to 3 hours, to form a complete catalyst.

The catalyst which is obtained as described above is inserted in a converter and used for purifying the exhaust gas from the internal-combustion engine such as on an automobile.

This catalyst may be used in an exhaust gas purifying system as a catalyst on the exhaust gas inlet side, while a catalyst obtained by depositing on a a monolithic carrier a mixture comprising a catalytically active component (a) rhodium and platinum or (b) rhodium, platinum, and palladium and a refractory inorganic oxide is used in the same system as a catalyst on the exhuast gas outlet side.

Conversely, the exhaust gas purifying system may use on the exhaust gas inlet side thereof the catalyst obtained by depositing on a monolithic carrier a mixture comprising a catalayctically active component comprising (a) rhodium and platinum or (b) rhodium, platinum, and palladium and an refractory inorganic oxide and on the exhaust gas outlet side thereof the catalyst of this invention mentioned above.

The precious metals to be contained in the precious metal catalyst which is used in the exhaust gas purifying system mentioned above are (a) rhodium and platinum or (b) rhodium, platinum, and palladium. The total amount of these precious metals to be used in the catalyst is in the range of from 0.1 g to 10 g, preferably from 0.3 g to 5 g, per liter of the catalyst. If this amount is less than 0.1 g, the produced precious metal catalyst is deficient in the purifying ability. Conversely, if the amount exceeds 10 g, the excess sparingly brings about a proportionate addition to the effect.

The refractory inorganic oxides which are effectively usable herein include activated alumina, silica, titania, cerium oxide, zirconium oxide, and oxides of alkali metals, alkaline earth metals, rare earth metals, iron, cobalt, and nickel, for example. These refractory inorganic oxides may be added in the form of metal or a metal oxide, for example. Activated alumina, cerium oxide, and zirconium oxide prove particularly desirable among other examples cited above.

The amount of the activated alumina (c) to be used is in the range of from 10 g to 350 g, preferably from 10 g to 250 g, per liter of the catalyst.

The monolithic carrier to be used in the catalyst on the exhaust gas inlet side and in the catalyst on the exhaust gas outlet side may be any of monolithic structures generally used in exhaust gas purifying catalysts. The honeycomb type or corrugated type monolithic structure is used. The material for the monolithic carrier has no particular restriction except for the sole requirement that it should possess fireproofness. For example, the monolithic carrier made of such a ceramic substance as cordierite which possesses fireproofness or such a ferrite type metal as stainless steel can be used.

The volumetric ratio of the catalyst on the exhaust gas inlet side to the catalyst on the exhaust gas outlet side is in the range of from 100:1 to 1:100, preferably from 50:1 to 1:50. If this volumetric ratio is less than 100:1 or not less than 1:100, the improvement of the performance due to the combination of these two catalysts is not manifested.

The catalyst on the exhaust gas inlet side and the catalyst on the exhaust gas outlet side can be installed in one and the same catalytic converter. Otherwise, they may be installed as suitably separated, depending on the shape of the exhaust gas pipe, the shape of the catalyst, and so on.

The catalyst on the exhaust gas inlet side and the catalyst on the exhaust gas outlet side each need not be limited to one piece. The catalyst on the exhaust gas inlet side and the catalyst on the exhaust gas outlet side may be used each as divided into a plurality of pieces, on the condition that this division should avoid inconveniencing the design of the exhaust gas purifying system in terms of the shape of the exhaust gas pipe, the selection of the position of the installation of catalyst, and the repression of the increase of back pressure of the exhaust gas, for example.

Now, this invention will be described more specifically below with reference to working examples. Of course, this invention may be practised otherwise without departing from the spirit of this invention.

EXAMPLE 1-1

Commercially available cerium oxide ($CeO_2$, specific surface area 149 $m^2/g$) and an aqueous zirconyl oxynitrate solution were mixed in a $CeO_2/ZrO_2$ ratio of 10/1 (the total weight of $CeO_2$ and $ZrO_2$:100 g). The resultant mixture was dried and then calcined at 500° C. for one hour, to produce a powder. In a ball mill, 100 g of the powder and an aqueous palladium nitrate solution containing 200 g of activated alumina ($\gamma$-$Al_2O_3$, average particle diameter 45 $\mu$m, and specific surface area 155 $m^2/g$), 16.7 g of barium acetate, and 4 g of palladium were pulverized to prepare an aqueous slurry. A monolithic carrier (33 mm in outside diameter$\times$76 mm in length) of cordierite possessing 400 cells per square inch of cross section was immersed in the slurry, removed from the slurry, blown with compressed air to expel excess slurry from within the cells, dried, and fired to obtain a complete catalyst.

EXAMPLE 1-2

A complete catalyst was obtained by following the procedure of Example 1-1, except that the amount of barium acetate was changed from 16.7 g to 50.1 g.

EXAMPLE 1-3

A complete catalyst was obtained by following the procedure of Example 1-1, exceptthat the amount of barium acetate was changed from 16.7 g to 0.83 g.

EXAMPLE 1-4

A complete catalyst was obtained by following the procedure of Example 1-1, except that 28.2 g of calcium acetate was used in the place of barium acetate.

EXAMPLE 1-5

A complete catalyst was obtained by following the procedure of Example 1-1, except that 19.8 g of strontium acetate was used in the place of barium acetate.

EXAMPLE 1-6

A complete catalyst was obtained by following the procedure of Example 1-1, except that the $CeO_2/ZrO_2$ ratio was changed to 10/1 (the total weight of $CeO_2$ and $ZrO_2$:30 g) and the amount of the activated alumina was changed to 270 g.

EXAMPLE 1-7

A complete catalyst was obtained by following the procedure of Example 1-1, except that the $CeO_2/ZrO_2$ ratio was changed to 10/1 (the total weight of $CeO_2$ and $ZrO_2$:160 g) and the amount of the activated alumina was changed to 140 g.

EXAMPLE 1-8

A complete catalyst was obtained by following the procedure of Example 1-1, except that the $CeO_2/ZrO_2$ ratio was changed to 10/3 (the total weight of $CeO_2$ and $ZrO_2$:100 g).

EXAMPLE 1-9

A complete catalyst was obtained by following the procedure of Example 1-1, except that the $CeO_2/ZrO_2$ ratio was changed to 25/1 (the total weight of $CeO_2$ and $ZrO_2$:100 g).

EXAMPLE 1-10

A complete catalyst was obtained by following the procedure of Example 1-1, except that 35.3 g of magnesium acetate was used in the place of barium acetate.

EXAMPLE 1-11

A complete catalyst was obtained by following the procedure of Example 1-1, except that an aqueous palladium nitrate solution containing 2 g of palladium was used in the place of the aqueous palladium nitrate solution containing 4 g of palladium.

EXAMPLE 1-12

A complete catalyst was obtained by following the procedure of Example 1-1, except that an aqueous palladium nitrate solution containing 8 g of palladium was used in the place of the aqueous palladium nitrate solution containing 4 g of palladium.

EXAMPLE 1-13

A complete catalyst was obtained by following the procedure of Example 1-1, except that an aqueous palladium nitrate containing 16 g of palladium was used in the place of the aqueous palladium nitrate solution containing 4 g of palladium.

EXAMPLE 1-14

A complete catalyst was obtained by following the procedure of Example 1-1, except that an aqueous palladium nitrate solution containing 40 g of palladium was used in the place of the aqueous palladium nitrate solution containing 4 g of palladium.

EXAMPLE 2-1

A complete catalyst was obtained by following the procedure of Example 1-1, except that the amount of barium acetate was changed from 16.7 g to 133.6 g.

EXAMPLE 2-2

A complete catalyst was obtained by following the procedure of Example 1-1, except that the $CeO_2/ZrO_2$ ratio was changed to 10/1 (the total weight of $Ceo_2$ and $ZrO_2$:200 g) and the amount of the activated alumina was changed to 100 g.

EXAMPLE 2-5

A complete catalyst was obtained by following the procedure of Example 1-1, except that the $CeO_2/ZrO_2$ ratio was changed to 10/1 (the total weight of $CeO_2$ and $ZrO_2$:260 g) and the amount of the activated alumina was changed to 40 g.

Control 1-1

A complete catalyst was obtained by following the procedure of Example 1-1, except that the use of barium acetate was omitted.

Control 1-2

A complete catalyst was obtained by following the procedure of Example 1-1, except that the use of zirconyl oxynitrate was omitted.

Control 1-3

A complete catalyst was obtained by following the procedure of Example 1-1, except that the use of zirconyl oxynitrate and barium acetate was omitted.

Control 1-4

A complete catalyst was obtained by impregnating 200 g of the same activated alumina as used in Example 1 with a solution resulting from mixture of an aqueous platinum dinitrodiamine solution containing 2.25 g of platinum with an aqueous rhodium nitrate solution containing 0.22 g of rhodium thereby forming a powder having the solutes deposited on the activated alumina, then pulverizing the powder and 100 g of the same cerium oxide as used in Example 1-1 in a ball mill, and then subjecting the product of pulverization to the procedure of Example 1-1.

Control 1-5

A complete catalyst was obtained by impregnating 200 g of the same activated alumina as used in Example 1-1 with the mixture of an aqueous palladium nitrate solution containing 2.25 of palladium with an aqueous rhodium nitrate solution containing 0.22 g of rhodium, drying the product of impregnation, calcining the dried composite to form a powder, pulverizing the powder and 100 g of the same cerium oxide as used in Example 1-1 in a ball mill, and subjecting the product of pulverization to the procedure of Example 1-b 1.

Control 1-6

A complete catalyst was obtained by pulverizing in a ball mill a solution resulting from mixture of an aqueous platinum dinitrodiamine solution containing 2.25 g of platinum with an aqueous rhodium nitrate solution containing 0.22 g of rhodium, a powder having 16.7 g of barium acetate deposited on 200 g of the same activated alumina as used in Example 1-1, and 100 g of a powder obtained by mixing the same cerium oxide and aqueous zirconyl oxynitrate solution as used in Example 1-1 in a $CeO_2/ZrO_2$ ratio of 10/1 (the total weight of $CeO_2$ and $ZrO_2$: 100 g), drying the resultant mixture, and calcining the dry mixture at 500° C. for one hour, and subjecting the resultant pulverized mixture to the procedure of Example 1-1.

Control 1-7

A complete catalyst was obtained by following the procedure of Example 1-1, except that 100 g of zirconium oxide was used in the place of cerium oxide and zirconium oxide.

The catalysts obtained in the working examples and controls described above were tested for amount of catalytic component deposited per liter of catalyst. The results are shown in Table 1.

EXAMPLE 1-15

The catalysts of Examples 1-1 to 2-3 and the catalysts of Controls 1-1 to 1-7 were tested for catalytic activity after use in an engine durability test.

The durability test was conducted by filling a multiconverter with sample catalysts, connecting the multiconverter to an exhaust sytem of a commercially available electronic control type engine (8 cylinders, 4,400 cc), and running the engine as prescribed. The engine was operated in a pattern of 60 seconds steady operation and 6 seconds reduced-speed operation (during the reduced-speed operation, the fuel supply was cut off and the catalyst was exposed to the harsh conditions of high-temperature oxiding atmosphere), with the catalysts left aging for 50 hours under such conditions that the catalyst inlet gas temperature remained at 850° C. during the steady operation.

The catalysts, after the aging, were tested for catalytic properties by filling a multiconverter with the catalysts, connecting this multiconverter to an exhaust system of a commercially available electronic control type engine (4 cylinders, 1,800 cc), and running the engine as prescribed. They were tested for three-way performance under the conditions of 400° C. of catalyst inlet gas temperature and 90,000 $hr^{-1}$ of space velocity. In this case, the average air/fuel ratio was continuously varied by introducing a 1 Hz seine wave signal from an external oscillator to a control unit of the engine thereby fluctuating the air/fuel (A/F) ratio to ±1.0 at 1

Hz while analyzing catalyst inlet and outlet gases simultaneously for composition thereby finding purifying ratios of CO, HC, and NO over the range of average air/fuel (A/F) ratio between 15.1 and 14.1.

A three-way characteristic curve was obtained by plotting the purifying ratios of CO, HC, and NO found as described above vs. the air/fuel ratios on a graph. The purifying ratio at the intersection of the CO and NO purifying ratio curves (hereinafter referred to as "crossover point"), the HC purifying ratio for the A/F value at that intersection, and the CO, HC, and NO purifying capacities at the A/F value of 14.2 (the rich side of the engine exhaust gas) are shown in Table 2.

It is clearly noted from Table 2 that the catalysts conforming to the teaching of this invention containing only palladium and no rhodium as precious metal were capable of simultaneously removing the three components, CO, HC, and NOx.

The catalysts were tested for purifying ability at low temperatures by connecting a multiconverter filled with sample catalysts to an exhaust system of an engine, inserting a heat exchanger in the exhaust system in front of the multiconverter, operating the engine at a fixed average air/fuel ratio (A/F) of 14.6 while fluctuating the air/fuel ratio (A/F) to $\pm 0.5$ at 1 Hz, continuously varying the catalyst inlet gas temperature from 200° C., to 500° C., and analyzing the catalyst inlet and outlet gases for composition, and finding the CO, HC, and NO purifying ratios. The temperatures at which the CO, HC, and NO purifying ratios were found to be 50% (light-off temperature) as described above are shown in Table 3.

EXAMPLE 2-4

The $CeO_2$ crystals were tested for diameter and oxygen consumption by the following procedure.

EXAMPLE 2-A

The same cerium oxide and aqueous zirconyl oxynitrate solution as used in Example 1-1 were mixed at varying $CeO_2/ZrO_2$ ratios of 100/4 (Sample No. a), 100/10 (Sample No. b), 100/30 (Sample No. c), and 100/50 (Sample No. d). The resultant mixtures were dried, calcined at 500° C., and then calcined in the air at 900° C. for 10 hours. In these samples, the total weight of $CeO_2$ and $ZrO_2$ was invariably 20 g.

EXAMPLE 2-B

An aqueous cerium nitrate solution and an aqueous zirconyl oxynitrate solution were mixed at a $CeO_2/ZrO_2$ ratio of 100/10 (Sample No. e). The resultant mixture was dried, fired at 500° C. for one hour, and then calcined in the air at 900° C. for 10 hours.

EXAMPLE 2-C

In the air, 20 g of the same cerium oxide as used in Example 1-1 was calcined at 900° C. for 10 hours (Sample f for control).

Measurement of crystal diameter

The samples of Examples 2-A, 2-B, and 2-C were subjected to X-ray diffraction to find diameters of cerium oxide crystals. The results are shown in Table 4. An object of the measurement of crystal diameter resides in that although the catalyst is required to be durability at high temperature, the durability at high temperature is difficult to be evaluated only by a normal temperature treatment, so whether a composite of cerium oxide and zirconium oxide at high temperature state is effective or not is carried out for evaluation. As such condition, the catalyst is calcined in air at 900° C. for 10 hours.

DETERMINATION OF OXYGEN CONSUMPTION

The samples obtained in Examples A, B, and C were tested for oxygen consumtion by charging an ordinary flow type pulse reaction device with each sample, passing helium gas through the sample, reducing the sample with hydrogen at 500° C. for 30 minutes, passing helium gas again through the sample for 15 minutes, cooling the sample in the same atmosphere to 400° C., passing a prescribed amount of oxygen pulses through the sample, measuring the amount of oxygen consumed during the passage through the sample, and calculating the amount of oxygen consumed per gram of the cerium oxide. The results are shown in Table 4.

The catalysts used for the determination of oxygen consumption were those obtained in Examples 1-1, 1-8, 1-9, and Control 2. These catalysts were compared in catalytic performance. The results are shown in Tables 2 and 3. It is clearly noted from the data of these tables that the catalysts using cerium oxides of high durability as contemplated by this invention exhibited outstanding exhaust gas purifying ability.

It is further noted from Table 4 that the cerium oxides were stabilized by a zirconium oxide in an atmosphere of oxygen at 900° C.

PREPARATION OF CATALYST

The catalyst obtained in Example 1-1 was finished as Complete Catalyst (I). Then, Complete Catalyst (II) was obtained by wet pulverizing in a ball mill a powder having 200 g of the same activated alumina as used in Example 1-1 impregnated with a solution resulting from mixture of an aqueous platinum dinitrodiamine solution containing 1.67 g of platinum with an aqueous rhodium nitrate solution containing 0.33 g of rhodium and 100 g of the same cerium oxide as used in Example 1-1 and subjecting the product of pulverization to the procedure described above.

EXAMPLE 2-7

Three combinations of Complete Catalyst (I) and Complete Catalyst (II) obtained as described in "Preparation of Catalyst" above, i.e. the combination (1) of the formerstage catalyst (I) and the latter-stage catalyst (II) and the combination (2) of the former-stage catalyst (II) and the latter-stage catalyst (I) both conforming to this invention and the combination (3) of the former-stage catalyst (II) and the latter-stage catalyst (II) intended as a control, were tested for CO, HC, and NO purifying ratios by following the methods used in Example 2-6. The results are shown in Table 5.

TABLE 1

|  | Noble metal* | Alkaline earth metal oxide* | $CeO_2/ZrO_2$** | Total $CeO_2$ and $ZrO_2$* |
|---|---|---|---|---|
| Example 1-1 | Pd:2.0 | BaO:5.0 | 10/1 | 50 |
| Example 1-2 | Pd:2.0 | BaO:15.0 | 10/1 | 50 |

TABLE 1-continued

|  | Noble metal* | Alkaline earth metal oxide* | $CeO_2/ZrO_2$** | Total $CeO_2$ and $ZrO_2$* |
|---|---|---|---|---|
| Example 1-3 | Pd:2.0 | BaO:0.25 | 10/1 | 50 |
| Example 1-4 | Pd:2.0 | CaO:5.0 | 10/1 | 50 |
| Example 1-5 | Pd:2.0 | SrO:5.0 | 10/1 | 50 |
| Example 1-6 | Pd:2.0 | BaO:5.0 | 10/1 | 15 |
| Example 1-7 | Pd:2.0 | BaO:5.0 | 10/1 | 80 |
| Example 1-8 | Pd:2.0 | BaO:5.0 | 10/3 | 50 |
| Example 1-9 | Pd:2.0 | BaO:5.0 | 25/1 | 50 |
| Example 1-10 | Pd:2.0 | MgO:5.0 | 10/1 | 50 |
| Example 1-11 | Pd:1.0 | BaO:5.0 | 10/1 | 50 |
| Example 1-12 | Pd:4.0 | BaO:5.0 | 10/1 | 50 |
| Example 1-13 | Pd:8.0 | BaO:5.0 | 10/1 | 50 |
| Example 1-14 | Pd:20.0 | BaO:5.0 | 10/1 | 50 |
| Example 2-1 | Pd:2.0 | BaO:40.0 | 10/1 | 50 |
| Example 2-2 | Pd:2.0 | BaO:5.0 | 10/1 | 100 |
| Example 2-3 | Pd:2.0 | BaO:5.0 | 10/1 | 130 |
| Control 1-1 | Pd:2.0 | — | 10/1 | 50 |
| Control 1-2 | Pd:2.0 | BaO:5.0 | 1/— | 50 |
| Control 1-3 | Pd:2.0 | — | 1/— | 50 |
| Control 1-4 | Pt:1.12 Rh:0.11 | — | 1/— | 50 |
| Control 1-5 | Pt:1.12 Rh:0.11 | BaO:5.0 | 1/— | 50 |
| Control 1-6 | Pt:1.12 Rh:0.11 | BaO:5.0 | 10/1 | 50 |
| Control 1-7 | Pd:2.0 | BaO:5.0 | —/1 | 50 |

*Amount, g, carried per liter of catalyst
**Weight ratio of oxides

TABLE 2

|  | Purifying ratio at crossover point (%) | | Purifying ratio at A/F of 14.2(%) | | |
|---|---|---|---|---|---|
|  | CO—COx* | HC | CO | HC | $NO_x$ |
| Example 1-1 | 88 | 94 | 36 | 66 | 92 |
| Example 1-2 | 90 | 95 | 36 | 70 | 92 |
| Example 1-3 | 84 | 91 | 34 | 64 | 84 |
| Example 1-4 | 87 | 94 | 36 | 65 | 92 |
| Example 1-5 | 88 | 94 | 36 | 66 | 92 |
| Example 1-6 | 78 | 88 | 34 | 60 | 86 |
| Example 1-7 | 90 | 94 | 36 | 68 | 92 |
| Example 1-8 | 90 | 94 | 36 | 69 | 92 |
| Example 1-9 | 82 | 88 | 34 | 62 | 85 |
| Example 1-10 | 78 | 88 | 34 | 62 | 81 |
| Example 1-11 | 83 | 91 | 35 | 62 | 86 |
| Example 1-12 | 91 | 96 | 36 | 68 | 92 |
| Example 1-13 | 95 | 96 | 37 | 75 | 96 |
| Example 1-14 | 98 | 97 | 40 | 88 | 99 |
| Example 2-1 | 90 | 95 | 36 | 70 | 92 |
| Example 2-2 | 92 | 94 | 36 | 71 | 92 |
| Example 2-3 | 93 | 95 | 36 | 72 | 92 |
| Control 1-1 | 73 | 85 | 32 | 58 | 51 |
| Control 1-2 | 65 | 82 | 30 | 52 | 55 |
| Control 1-3 | 60 | 78 | 25 | 45 | 40 |
| Control 1-4 | 82 | 86 | 35 | 53 | 85 |
| Control 1-5 | 77 | 87 | 34 | 52 | 82 |
| Control 1-6 | 84 | 87 | 35 | 54 | 82 |
| Control 1-7 | 55 | 70 | 21 | 39 | 35 |

*Magnitude of purifying ratio at intersection between CO—NOx and CO purifying ratio curves and NOx purifying ratio

TABLE 3

|  | Light off temperature (°C.) | | |
|---|---|---|---|
|  | CO | HC | NO |
| Example 1-1 | 363 | 368 | 357 |
| Example 1-2 | 360 | 365 | 354 |
| Example 1-3 | 373 | 378 | 369 |
| Example 1-4 | 362 | 367 | 356 |
| Example 1-5 | 364 | 367 | 357 |
| Example 1-6 | 388 | 393 | 382 |
| Example 1-7 | 360 | 364 | 353 |
| Example 1-8 | 360 | 364 | 353 |
| Example 1-9 | 374 | 377 | 368 |
| Example 1-10 | 390 | 394 | 384 |
| Example 1-11 | 387 | 392 | 381 |
| Example 1-12 | 343 | 348 | 337 |
| Example 1-13 | 325 | 329 | 317 |
| Example 1-14 | 290 | 294 | 282 |
| Example 2-1 | 360 | 365 | 354 |
| Example 2-2 | 358 | 363 | 352 |
| Example 2-3 | 355 | 361 | 350 |
| Control 1-1 | 421 | 424 | 446 |
| Control 1-2 | 418 | 421 | 443 |
| Control 1-3 | 423 | 427 | 446 |
| Control 1-4 | 374 | 379 | 368 |
| Control 1-5 | 385 | 390 | 379 |
| Control 1-6 | 401 | 407 | 395 |
| Control 1-7 | 425 | 429 | 448 |

TABLE 4

|  | $CeO_2$ crystal system (Å) | Amount of oxygen consumed ($\times 10^{-5}$ mol $O_2$/g $CeO_2$) |
|---|---|---|
| Sample No. a | 210 | 6 |
| Sample No. b | 140 | 19 |
| Sample No. c | 135 | 20 |
| Sample No. d | 138 | 19 |
| Sample No. e | 137 | 19 |
| Sample No. f | 499 | 1 |

TABLE 5

| Catalyst combination | Purifying ratio at crossover point | | Purifying ratio at A/F of 14.2(%) | | | Light off temperature (°C.) | | |
|---|---|---|---|---|---|---|---|---|
|  | CO—NOx (%) | HC (%) | CO | HC | NOx | CO | HC | NO |
| (1) | 92 | 94 | 36 | 70 | 92 | 335 | 334 | 352 |
| (2) | 92 | 93 | 35 | 65 | 92 | 336 | 346 | 353 |
| (3) | 85 | 88 | 35 | 53 | 85 | 375 | 380 | 368 |

EXAMPLE 3-1

A powder of the amount 100 g was obtained by mixing a commercially available cerium oxide ($CeO_2$, specific surface area: 149 m²/g) with an aqueous zirconyl oxynitrate solution in a $CeO_2/ZrO_2$ ratio of 10/1 (the total amount of $CeO_2$ and $ZrO_2$:100 g), drying the resultant mixture, and calcining the dry mixture at 500° C. for 1 hour. A powder of the amount 200 g was obtained by immersing 180 g of activated alumina ($\gamma$-Al$_2$O$_3$, average particle diameter 45 $\mu$m, specific surface area: 155 m$^2$/g) in an aqueous lanthanum acetate solution containing 20 g of lanthanum oxide, drying the wet solid, and calcining the dry solid. A water-soluble slurry was prepared by wet pulverizing the powders mentioned above, 16.7 g of barium acetate, and an aqueous palladium nitrate solution containing 4 g of palladium in a ball mill. A monolithic carrier of cordierite (33 mm in outside diameter×76 mm in length) possessing 400 cells per square inch of cross-sectional area was immersed in the slurry, taken out of the slurry, blown with compressed air to expel the excess slurry remaining within the cells, dried, and calcined, to obtain a complete catalyst.

EXAMPLE 3-2

A powder of the amount 120 g was obtained by mixing the same cerium oxide as used in Example 3-1 with an aqueous zirconyl oxynitrate solution in a CeO$_2$/ZrO$_2$ ratio of 10/1 (the total weight of CeO$_2$ and ZrO$_2$:100 g), combining the resultant mixture with an aqueous lanthanum nitrate solution containing 20 g of lanthanum oxide, drying the produced blend, and calcining the dry blend at 500° C. for 1 hour. A water-soluble slurry was prepared by wet pulverizing in a ball mill the powder mentioned above, 180 g of activated alumina, and an aqueous palladium nitrate solution containing 4 g of palladium. A monolithic carrier of cordierite (33 mm in insideoutside diameter×76 mm in length) possessing 400 cells per square inch of cross-sectional area, taken out of the slurry, brown with compressed air to expel the excess slurry remaining within the cells, dried, and calcined, to obtain a complete catalyst.

EXAMPLE 3-3

A powder of the amount 300 g was obtained by mixing 100 g of the powder of CeO$_2$/Zr.O$_2$ with 180 g of activated alumina, combining the resultant powder with an aqueous lanthanum acetate solution containing 20 g of lanthanum oxide, drying the resultant solution, and calcining the dry solid at 500° C. for 1 hour. In the place of the slurry of Example 3-1, a water-soluble slurry was obtained by wet pulverizing in a ball mill the powder mentioned above, 16.7 g of barium acetate, and an aqueous palladium nitrate solution containing 4 g of palladium. A monolithic carrier of cordierite (33 mm in outside diameter×76 mm in length) possessing 400 cells per square inch of cross-sectional area, taken out of the slurry, blown with compressed air to expel the excess slurry remaining inside the cells, dried, and calcined to obtain a complete catalyst.

EXAMPLE 3-4

A slurry was obtained by wet pulverizing in a ball mill 100 g of the same CeO$_2$ZrO$_2$ powder as obtained in Example 3-1, 180 g of activated alumina, an aqueous lanthanum acetate solution containing 20 g of lanthanum oxide, 16.7 g of barium acetate, and an aqueous palladium nitrate solution containing 4 g of palladium. Then, a monolithic carrier of cordierite (33 mm in outside diameter×76 mm in length) possessing 400 cells per square inch of cross-sectional area was immersed in the slurry, taken out of the slurry, blown with compressed air to expel the excess slurry from within the cells, dried, and calcined to obtain a complete catalyst.

EXAMPLE 3-5

A complete catalyst was obtained by following the procedure of Example 3-1, except that the amount of lanthanum oxide was changed from 20 g to 1 g.

EXAMPLE 3-6

A complete catalyst was obtained by following the procedure of Example 3-1, except that the amount of lanthanum oxide was changed from 20 g to 90 g.

EXAMPLE 3-7

A complete catalyst was obtained by following the procedure of Example 3-1, except that the amount of barium acetate was changed from 16.7 g to 133.6 g.

EXAMPLE 3-8

A complete catalyst was obtained by following the procedure of Example 3-1, except that the amount of barium acetate was changed from 16.7 g to 0.83 g.

EXAMPLE 3-9

A complete catalyst was obtained by following the procedure of Example 3-1, except that 28.2 g of calcium acetate was used in the place of barium acetate.

EXAMPLE 3-10

A complete catalyst was obtained by following the procedure of Example 3-1, except that 19.8 g of strontium acetate was used in the place barium acetate.

EXAMPLE 3-11

A complete catalyst was obtained by following the procedure of Example 3-1, except that the CeO$_2$/ZrO$_2$ ratio was changed to 10/1 (the total weight of CeO$_2$ and ZrO$_2$:30 g).

EXAMPLE 3-12

A complete catalyst was obtained by following the procedure of Example 3-1, except that the CeO$_2$/CrO$_2$ ratio was changed to 10/1 (the total weight of CeO$_2$ and ZrO$_2$:160 g).

EXAMPLE 3-13

A complete catalyst was obtained by following the procedure of Example 3-1, except that the CeO$_2$/CrO$_2$ ratio was changed to 10/3 (the total weight of CeO$_2$ and ZrO$_2$:100 g).

EXAMPLE 3-14

A complete catalyst was obtained by following the procedure of Example 3-1, except that the CeO$_2$/ZrO$_2$ ratio was changed to 25/1 (the total weight of CeO$_2$ and ZrO$_2$:100 g).

EXAMPLE 3-15

A complete catalyst was obtained by following the procedure of Example 3-1, except that 35.3 g of magnesium acetate was used in the place of barium acetate.

EXAMPLE 3-16

A complete catalyst was obtained by following the procedure of Example 3-1, except that an aqueous palladium nitrate solution containing 2 g of palladium was used in the place of the aqueous palladium nitrate solution containing 4 g of palladium.

EXAMPLE 3-17

A complete catalyst was obtained by following the procedure of Example 3-1, except that an aqueous palladium nitrate solution containing 8 g of palladium was used in the place of the aqueous palladium nitrate solution containing 8 g of palladium.

EXAMPLE 3-18

A complete catalyst was obtained by following the procedure of Example 3-1, except that an aqueous palladium nitrate solution containing 8 g of palladium was used in the place of the aqueous palladium nitrate solution containing 4 g of palladium.

EXAMPLE 3-19

A complete catalyst was obtained by following the procedure of Example 3-1, except that an aqueous palladium nitrate solution containing 40 g of palladium was used in the place of the aqueous palladium nitrate solution containing 4 g of palladium.

EXAMPLE 3-20

A complete catalyst was obtained by following the procedure of Example 3-1, except that a ratio of $CeO_2/ZrO_2$ was changed to 10/1 (total of $CeO_2$ and $ZrO_2$ was 260 g).

Conrol 3-1

A complete catalyst was obtained by following the procedure of Example 3-1, except that the use of barium acetate was omitted.

Control 3-2

A complete catalyst was obtained by following the procedure of Example 3-1, except that the use of zirconyl oxynitrate was omitted.

Control 3-3

A complete catalyst was obtained by following the procedure of Example 3-1, except that the use of zirconyl oxynitrate and barium acetate was omitted.

Control 3-4

A complete catalyst was obtained by following the procedure of Example 3-1, except that the use of lanthanum oxide was omitted.

Control 3-5

A complete catalyst was obtained by mixing an aqueous platinum dinitrodiamine solution containing 2.25 g of platinum with an aqueous rhodium nitrate solution containing 0.22 g of rhodium, impregnating 200 g of the same activated aluminum as used in Example 3-1 with the resultant mixed solution thereby obtaining a powder, wet pulverizing the powder with 100 g of the same cerium oxide as used in Example 3-1 in a ball mill, and thereafter subjecting the product of pulverization to the procedure of Example 3-1.

Control 3-6

A complete catalyst was obtained by mixing an aqueous palladium nitrate solution containing 2.25 g of palladium with an aqueous rhodium nitrate solution containing 0.22 g of rhodium, impregnating 200 g of the same activated alumina as used in Example 3-1 with the resultant mixed solution, drying the product of impregnation, and calcining the dried solid thereby forming a powder, wet pulverizing the powder with 100 g of the same cerium oxide as used in Example 3-1 in a ball mill, and thereafter subjecting the product of pulverization to the procedure of Example 3-1.

Control 3-7

A complete catalyst was obtained by wet pulverizing in a ball mill a solution resulting from mixture of an aqueous platinum dinitrodiamine solution containing 2.25 g of platinum with an aqueous rhodium nitrate solution containing 0.22 g of rhodium, a powder having 200 g of the same activated alumina as used in Example 3-1 impregnated with 16.7 g of barium acetate, and 100 g of a powder prepared by mixing the same cerium oxide as used in Example 3-1 with an aqueous zirconyl oxynitrate solution in a $CeO_2/ZrO_2$ ratio of 10/1 (the total weight of CeO.2 and $CrO_2$:100 g), drying the resultant mixture, and calcining the dried mixture at 500° C. for one hour and thereafter treating the product of wet pulverization in the same manner as in Example 3-1.

Supporting amount of each catalytic components of the catalyst thus obtained in Examples and Controls per liter of the catalyst are shown in Tabele 6 and Table 7.

EXAMPLE 3-21

Then, the catalysts of Examples 3-1 to 3-20 and the catalysts of Controls 3-1 to 3-7 were tested for catalytic activity after an engine durability test in the same manner as in Example 1-15, except that a temperature of an inlet gas during steady operation was changed to 900° C. The results are shown in Table 8 and Table 9.

TABLE 6

| | Normal metal* | Alkaline earth metal oxide* | Lanthnam oxide* | $CeO_2/ZrO_2$** | Total $CeO_2$ and $ZrO_2$ |
|---|---|---|---|---|---|
| Example 3-1 | Pd:2.0 | BaO:5.0 | 10 | 10/1 | 50 |
| Example 3-2 | Pd:2.0 | BaO:5.0 | 10 | 10/1 | 50 |
| Example 3-3 | Pd:2.0 | BaO:5.0 | 10 | 10/1 | 50 |
| Example 3-4 | Pd:2.0 | BaO:5.0 | 0.5 | 10/1 | 50 |
| Example 3-5 | Pd:2.0 | BaO:5.0 | 45 | 10/1 | 50 |
| Example 3-6 | Pd:2.0 | BaO:5.0 | 10 | 10/1 | 50 |
| Example 3-7 | Pd:2.0 | BaO:40 | 10 | 10/1 | 50 |
| Example 3-8 | Pd:2.0 | BaO:0.25 | 10 | 10/1 | 50 |
| Example 3-9 | Pd:2.0 | CaO:5.0 | 10 | 10/1 | 50 |
| Example 3-10 | Pd:2.0 | SrO:5.0 | 10 | 10/1 | 50 |
| Example 3-11 | Pd:2.0 | BaO:5.0 | 10 | 10/1 | 15 |
| Example 3-12 | Pd:2.0 | BaO:5.0 | 10 | 10/1 | 80 |
| Example 3-13 | Pd:2.0 | BaO:5.0 | 10 | 10/3 | 50 |
| Example 3-14 | Pd:2.0 | BaO:5.0 | 10 | 25/1 | 50 |
| Example 3-15 | Pd:2.0 | MgO:5.0 | 10 | 10/1 | 50 |
| Example 3-16 | Pd:1.0 | BaO:5.0 | 10 | 10/1 | 50 |
| Example 3-17 | Pd:4.0 | BaO:5.0 | 10 | 10/1 | 50 |

TABLE 6-continued

|  | Normal metal* | Alkaline earth metal oxide* | Lanthnam oxide* | $CeO_2/ZrO_2$** | Total $CeO_2$ and $ZrO_2$ |
|---|---|---|---|---|---|
| Example 3-18 | Pd:8.0 | BaO:5.0 | 10 | 10/1 | 50 |
| Example 3-19 | Pd:20.0 | BaO:5.0 | 10 | 10/1 | 50 |
| Example 3-20 | Pd:2.0 | BaO:5.0 | 10 | 10/1 | 130 |

*Amount, g, carried per liter of catalyst
**Weight ratio of oxides

TABLE 7

|  | Normal metal* | Alkaline earth metal oxide* | Lanthnam oxide* | $CeO_2/ZrO_2$* | Total $CeO_2$ and $ZrO_2$ |
|---|---|---|---|---|---|
| Control 3-1 | Pd:2.0 | — | 10 | 10/1 | 50 |
| Control 3-2 | Pd:2.0 | BaO:5.0 | 10 | 10/— | 50 |
| Control 3-3 | Pd:2.0 | — | 10 | 10/— | 50 |
| Control 3-4 | Pd:2.0 | BaO:5.0 | — | 10/1 | 50 |
| Control 3-5 | Pt:2.25 Rh:0.22 | — | — | 10/— | 50 |
| Control 3-6 | Pt:2.25 Rh:0.22 | — | — | 10/— | 50 |
| Control 3-7 | Pt:2.25 Rh:0.22 | BaO:5.0 | 10 | 10/1 | 50 |

*Amount, g, carried per liter of catalyst
**Weight ratio of oxides

TABLE 8

|  | Purifying ratio at crossover point (%) | | Purifying ratio at A/F of 14.2(%) | | | Light off temperature (°C.) | | |
|---|---|---|---|---|---|---|---|---|
|  | CO—NOx* | HC | CO | HC | NOx | CO | HC | NO |
| Example 3-1 | 92 | 94 | 36 | 68 | 92 | 353 | 358 | 347 |
| Example 3-2 | 91 | 93 | 36 | 67 | 92 | 351 | 357 | 346 |
| Example 3-3 | 91 | 94 | 36 | 68 | 92 | 354 | 359 | 348 |
| Example 3-4 | 92 | 93 | 37 | 66 | 93 | 353 | 359 | 347 |
| Example 3-5 | 88 | 89 | 34 | 60 | 89 | 370 | 375 | 364 |
| Example 3-6 | 95 | 96 | 38 | 69 | 94 | 333 | 338 | 327 |
| Example 3-7 | 95 | 96 | 38 | 69 | 94 | 340 | 344 | 332 |
| Example 3-8 | 86 | 88 | 34 | 60 | 88 | 371 | 375 | 365 |
| Example 3-9 | 91 | 93 | 36 | 67 | 90 | 355 | 359 | 349 |
| Example 3-10 | 92 | 94 | 36 | 68 | 92 | 354 | 358 | 347 |
| Example 3-11 | 86 | 88 | 34 | 61 | 89 | 378 | 379 | 372 |
| Example 3-12 | 93 | 94 | 36 | 69 | 92 | 342 | 347 | 336 |
| Example 3-13 | 92 | 94 | 35 | 68 | 92 | 352 | 359 | 346 |
| Example 3-14 | 90 | 92 | 34 | 68 | 91 | 351 | 357 | 346 |
| Example 3-15 | 83 | 86 | 32 | 58 | 80 | 373 | 377 | 367 |
| Example 3-16 | 87 | 88 | 34 | 69 | 88 | 374 | 378 | 369 |
| Example 3-17 | 95 | 97 | 83 | 69 | 94 | 332 | 337 | 328 |
| Example 3-18 | 97 | 98 | 38 | 70 | 96 | 311 | 317 | 315 |
| Example 3-19 | 100 | 100 | 45 | 80 | 100 | 287 | 289 | 299 |
| Example 3-20 | 94 | 95 | 38 | 69 | 94 | 340 | 345 | 334 |

*Magnitude of purifying ratio at intersection between CO—NOx and CO purifying ratio Curves and NOx purifying ratio

TABLE 9

|  | Purifying ratio at crossover point (%) | | Purifying ratio at A/F of 14.2(%) | | | Light off temperature (°C.) | | |
|---|---|---|---|---|---|---|---|---|
|  | CO—NOx* | HC | CO | HC | NOx | CO | HC | NO |
| Control 3-1 | 60 | 78 | 24 | 44 | 40 | 420 | 423 | 440 |
| Control 3-2 | 70 | 81 | 27 | 44 | 60 | 399 | 403 | 410 |
| Control 3-3 | 54 | 75 | 23 | 41 | 34 | 430 | 433 | 448 |
| Control 3-4 | 78 | 88 | 33 | 53 | 73 | 396 | 400 | 407 |
| Control 3-5 | 73 | 83 | 32 | 48 | 70 | 401 | 410 | 398 |
| Control 3-6 | 68 | 80 | 30 | 39 | 54 | 411 | 420 | 403 |
| Control 3-7 | 61 | 75 | 28 | 37 | 60 | 435 | 440 | 413 |

*Magnitude of purifying ratio at intersection between CO—NOx and CO purifying ratio Curves and NOx purifying ratio

EXAMPLE 4-1

(b) Cerium oxide having zirconium and lanthanum deposited thereon

A powder (b) was obtained by mixing 50 g of commercially available cerium oxide ($CeO_2$, specific surface area:149 m²/g) with an aqueous solution of zirconyl oxynitrate and lanthanum nitrate (containing 5 g of zirconium oxide and 10 g of lanthanum oxide), drying the resultant mixture, and calcining the dry mixture at 500° C. for one hour.

(c) Refractory inorganic oxide having cerium and zirconium deposited thereon

A powder (c) was obtained by mixing 60 g of activated aluminum (γ-Al$_2$O$_3$, average particle diameter 45 m, and specific surface area 155 m$^2$/g) with an aqueous solution of cerium nitrate and zirconyl oxynitrate (containing 50 g of cerium oxide and 5 g of zirconium oxide), drying the resultant mixture, and calcining the dried mixture at 500° C. for 1 hour.

A water-soluble slurry was prepared by wet pulverizing in a ball mill the powders (b) and (c) and barium acetate (20 g as barium oxide) and an aqueous palladium nitrate solution containing 3 g of palladium. A monolithic carrier of cordierite (33 mm in outside diameter × 76 mm in length) possessing 400 cells per square inch of cross-sectional area was immersed in the slurry, taken out of the slurry, blown with compressed air to expel the excess slurry remaining inside the cells, dried, and calcined to obtain a complete catalyst.

EXAMPLES 4-2 to 4-8

Complete catalysts were obtained by following the procedure of Example 4-1, except that the amounts of cerium oxide, zirconium oxide, and lanthanum oxide in the powder (b) and the amounts of cerium oxide and zirconium oxide in the powder (c) were varied. The catalysts consequently obtained in the examples were examined to determine the amounts of catalyst components carried per liter of catalyst. The results are shown in Table 10.

EXAMPLES 4-9 and 4-10

Complete catalysts were obtained by following the procedure of Example 4-1, except that the amount of barium acetate (20 g as barium oxide) was changed to the amounts (0.5 g and 40 g as barium oxide) respectively.

EXAMPLES 4-11 and 4-12

Complete catalysts were obtained by following the procedure of Example 4-1, except that calcium acetate and strontium acetate (each 20 g as oxide) were used in the place of barium acetate (20 g as barium oxide).

EXAMPLES 4-13 and 4-14

Complete catalysts were obtained by following the procedure of Example 4-1, except that the contents of cerium oxide and zirconium oxide in the powder (b) and the contents of cerium oxide and zirconium oxide in the powder (c) were varied.

EXAMPLES 4-15 and 4-16

Complete catalysts were obtained by following the procedure of Example 4-4, except that the amount of palladium, 3 g, in the aqueous palladium nitrate solution was changed to 10 g and 20 g respectively.

Control 4-1

A complete catalyst was obtained by following the procedure of Example 4-4, except that the use of barium acetate was omitted.

Control 4-2

A complete catalyst was obtained by following the procedure of Example 4-4, except that the use of lanthanum nitrate was omitted.

Control 4-3

A complete catalyst was obtained by following the procedure of Example 4-4, except that the use of zirconyl oxynitrate was omitted.

Control 4-4

A powder was obtained by mixing 100 g of the same cerium oxide as used in Example 4-1 with an aqueous solution of zirconyl oxynitrate and lanthanum nitrate (10 g as zirconium oxide and 10 g as lanthanum oxide), drying the resultant mixture, and calcining the dried mixture at 500° C for 1 hour. A complete catalyst was produced by combining this powder and 60 g of the same activated alumina as used in Example 4-1, barium acetate (20 g as barium oxide), and palladium nitrate containing 3 g of palladium in the same manner as in Example 4-1.

Control 4-5

A powder was obtained by mixing 60 g of the same activated alumina as used in Example 4-1 with zirconyl oxynitrate and lanthanum nitrate (containing 100 g of cerium oxide, 10 g of zirconium oxide, and 10 g of lanthanum oxide), drying the resultant mixture, and calcining the dried mixture at 500° C. for 1 hour. A complete catalyst was produced by combining this powder with barium acetate (20 g as barium oxide) and palladium nitrate containing 3 g of palladium in the same manner as in Example 4-1.

Control 4-6

A powder was obtained by mixing an aqueous platinum dinitrodiamine solution containing 2.25 g of platinum with an aqueous rhodium nitrate solution containing 0.22 g of rhodium and immersing 200 g of the same activated alumina as used in Example 4-1 in the resultant mixed solution. A complete catalyst was produced by wet pulverizing in a ball mill the powder and 100 g of the same cerium oxide as used in Example 4-1 and treating the product of the wet pulverization in the same manner as in Example 4-1.

Control 4-7

A powder was obtained by mixing an aqueous palladium nitrate solution containing 2.25 g of palladium with an aqueous rhodium nitrate solution containing 0.22 g of rhodium, impregnating 200 g of the same activated alumina as used in Example 4-1 with the resultant mixed solution, drying the product of impregnation, and calcining the dried solid. A complete catalyst was produced by wet pulverizing in a ball mill the powder with 100 g of the same cerium oxide as used in Example 4-1, and treating the product of pulverization in the same manner as in Example 4-1.

Supporting amount of each catalytic components of the catalyst thus obtained in Examples and Controls per liter of the catalyst are shown in Table 10.

EXAMPLE 4-17

The catalysts obtained in Examples 4-1 to 4-16 and Controls 4-1 to 4-7 were tested for catalytic activity after an engine durability test in the same manner as in Example 3-21. The results are shown in Table 11.

TABLE 10

| | Pd (g/l) | Alkaline earth metal oxide (g/l) | (b) CeO$_2$ | (b) ZrO$_2$ | (b) La$_2$O$_3$ | (c) CeO$_2$ | (c) ZrO$_2$ | CeO$_2$ of (b)/CeO$_2$ of (c) (total CeO$_2$) | CeO$_2$/ZrO$_2$ (oxide ratio) |
|---|---|---|---|---|---|---|---|---|---|
| Example 4-1 | 3 | BaO:20 | 50 | 5 | 10 | 50 | 5 | 100/100(100) | 10/1 |
| Example 4-2 | 3 | BaO:20 | 95 | 9.5 | 10 | 5 | 0.5 | 100/5.3(100) | 10/1 |
| Example 4-3 | 3 | BaO:20 | 18 | 1.8 | 10 | 82 | 8.2 | 22/100 | 10/1 |
| Example 4-4 | 3 | BaO:20 | 80 | 8 | 10 | 20 | 2 | 100/25(100) | 10/1 |
| Example 4-5 | 3 | BaO:20 | 80 | 8 | 0.5 | 20 | 2 | 100/25(100) | 10/1 |
| Example 4-6 | 3 | BaO:20 | 80 | 8 | 40 | 20 | 2 | 100/25(100) | 10/1 |
| Example 4-7 | 3 | BaO:20 | 80 | 24 | 10 | 20 | 6 | 100/25(100) | 10/3 |
| Example 4-8 | 3 | BaO:20 | 80 | 3.2 | 10 | 20 | 0.8 | 100/25(100) | 25/1 |
| Example 4-9 | 3 | BaO:0.5 | 80 | 8 | 10 | 20 | 2 | 100/25(100) | 10/1 |
| Example 4-10 | 3 | BaO:40 | 80 | 8 | 10 | 20 | 2 | 100/25(100) | 10/1 |
| Example 4-11 | 3 | CaO:20 | 80 | 8 | 10 | 20 | 2 | 100/25(100) | 10/1 |
| Example 4-12 | 3 | SrO:20 | 80 | 8 | 10 | 20 | 2 | 100/25(100) | 10/1 |
| Example 4-13 | 3 | BaO:20 | 112 | 11.2 | 10 | 28 | 2.8 | 100/25(140) | 10/1 |
| Example 4-14 | 3 | BaO:20 | 40 | 4 | 10 | 10 | 1 | 100/25(50) | 10/1 |
| Example 4-15 | 10 | BaO:20 | 80 | 8 | 10 | 20 | 2 | 100/25(100) | 10/1 |
| Example 4-16 | 20 | BaO:20 | 80 | 8 | 10 | 20 | 2 | 100/25(100) | 10/1 |
| Control 4-1 | 3 | — | 80 | 8 | 10 | 20 | 2 | 100/25(100) | 10/1 |
| Control 4-2 | 3 | BaO:20 | 80 | 8 | — | 20 | 2 | 100/25(100) | 10/1 |
| Control 4-3 | 3 | BaO:20 | 80 | — | 10 | 20 | — | 100/25(100) | 10/0 |
| Control 4-4 | 3 | BaO:20 | 100 | 10 | 10 | — | — | 100/0(100) | 10/1 |
| Control 4-5 | 3 | BaO:20 | — | — | 10 | 100 | 10 | 0/100(100) | 10/1 |
| Control 4-6 | Pt:1.125 Rh:0.11 | — | 50 | — | — | — | — | — | — |
| Control 4-7 | Pt:1.125 Rh:0.11 | — | 50 | — | — | — | — | — | — |

TABLE 11

| | | Purifying ratio at crossover point (%) CO—NOx* | Purifying ratio at crossover point (%) HC | Purifying ratio at A/F of 14.2(%) | Light off temperature (°C.) CO | Light off temperature (°C.) HC | Light off temperature (°C.) NO |
|---|---|---|---|---|---|---|---|
| Example 4-1 | 1 | 91 | 94 | 88 | 348 | 362 | 369 |
| Example 4-2 | 2 | 93 | 95 | 80 | 345 | 359 | 365 |
| Example 4-3 | 3 | 88 | 91 | 85 | 349 | 363 | 371 |
| Example 4-4 | 4 | 92 | 94 | 88 | 347 | 361 | 368 |
| Example 4-5 | 5 | 83 | 91 | 80 | 356 | 371 | 379 |
| Example 4-6 | 6 | 93 | 95 | 81 | 346 | 358 | 364 |
| Example 4-7 | 7 | 92 | 94 | 88 | 347 | 358 | 365 |
| Example 4-8 | 8 | 83 | 91 | 79 | 360 | 374 | 380 |
| Example 4-9 | 9 | 90 | 94 | 81 | 348 | 362 | 369 |
| Example 4-10 | 10 | 92 | 94 | 89 | 347 | 362 | 368 |
| Example 4-11 | 11 | 91 | 94 | 87 | 347 | 361 | 368 |
| Example 4-12 | 12 | 92 | 94 | 87 | 346 | 363 | 369 |
| Example 4-13 | 13 | 94 | 96 | 90 | 342 | 359 | 365 |
| Example 4-14 | 14 | 83 | 91 | 78 | 359 | 373 | 378 |
| Example 4-15 | 15 | 96 | 98 | 93 | 324 | 328 | 319 |
| Example 4-16 | 16 | 100 | 100 | 95 | 288 | 290 | 300 |
| Control 4-1 | 1 | 78 | 85 | 31 | 389 | 403 | 410 |
| Control 4-2 | 2 | 79 | 86 | 74 | 395 | 401 | 408 |
| Control 4-3 | 3 | 75 | 83 | 70 | 400 | 409 | 408 |
| Control 4-4 | 4 | 90 | 94 | 74 | 358 | 373 | 381 |
| Control 4-5 | 5 | 81 | 88 | 71 | 396 | 399 | 401 |
| Control 4-6 | 6 | 73 | 83 | 65 | 401 | 410 | 398 |
| Control 4-7 | 7 | 68 | 80 | 50 | 411 | 420 | 403 |

*Magnitude of purifying ratio at intersection between CO—NOx and CO purifying ratio Curves and NOx purifying ratio

EXAMPLE 5-1

A powder (CeO$_2$ ZrO$_2$) of the amount 100 g was obtained by mixing commercially available cerium oxide (CeO$_2$, specific surface area 149 m$_2$/g) with an aqueous zirconyl oxynitrate solution in a CeO$_2$/ZrO$_2$ ratio of 10/1 (the total weight of CeO$_2$ and ZrO$_2$:100 g), drying the resultant mixture, and calcining the dried mixture at 500 C. for one hour.

Then, a powder of the amount 100 g was obtained by immersing 196 g of activated alumina ($\gamma$-Al$_2$O$_3$, average particle diameter 45 $\mu$m, and specific surface area 155 m$^2$/g) in a commercially available aqueous silica sol solution containing 4 g of silica, drying the impregnated activated alumina, and calcining the resultant dried solid. A water-soluble slurry was prepared by wet pulverizing in a ball mill the powder, 16.7 g of barium acetate, and an aqueous palladium nitrate solution containing 4 g of palladium. A monolithic carrier of cordierite (33 mm in outside diameter $\times$ 76 mm in length) possessing 400 cells per square inch of cross-sectional area was immersed in the slurry, removed from the slurry, blown with compressed air to expel the excessive slurry from within the cells, dried, and calcined to produce a complete catalyst.

EXAMPLE 5-2

A powder of the amount 104 g was obtained by immersing 100 g of the same CeO$_2$ ZrO$_2$ powder as obtained in Example 5-1 in a commercially available aqueous silica sol solution containing 4 g of silica, drying the resultant wet mixture, and calcining the dried mixture. A water-soluble slurry was prepared by combining the powder with 196 g of the same activated alumina as used in Example 5-1, 16.7 g of barium acetate, and an aqueous palladium nitrate solution containing 4 g of palladium in a ball mill. This slurry was treated in the same manner as in Example 5-1, to produce a complete catalyst.

EXAMPLE 5-3

A complete catalyst was obtained by following the procedure of Example 5-1, except that the amount of silica was changed from 4 g to 60 g and the amount of activated alumina from 196 g to 116 g.

EXAMPLE 5-4

A complete catalyst was obtained by following the procedure of Example 5-1, except that the amount of silica was changed from 4 g to 0.4 g and the amount of activated alumina from 196 g to 199.6 g.

EXAMPLE 5-5

A complete catalyst was obtained by following the procedure of Example 5-1, except that the amount of barium acetate was changed from 16.7 g to 133.6 g.

EXAMPLE 5-6

A complete catalyst was obtained by following the procedure of Example 5-1, except that the amount of barium acetate was changed from 16.7 g to 0.83 g.

EXAMPLE 5-7

A complete catalyst was obtained by following the procedure of Example 5-1, except that 28.2 g of calcium acetate was used in the place of barium acetate.

EXAMPLE 5-8

A complete catalyst was obtained by following the procedure of Example 5-1, except that 19.8 g of strontium acetate was used in the place of barium acetate.

EXAMPLE 5-9

A complete catalyst was obtained by following the procedure of Example 5-1, except that the $CeO_2/ZrO_2$ ratio was changed to 10/1 (the total weight of $CeO_2$ and $ZrO_2$:30 g).

EXAMPLE 5-10

A complete catalyst was obtained by following the procedure of Example 5-1, except that the $CeO_2/ZrO_2$ ratio was changed to 10/1 (the total weight of $CeO_2$ and $ZrO_2$:160 g).

EXAMPLE 5-11

A complete catalyst was obtained by following the procedure of Example 5-1, except that the $CeO_2/ZrO_2$ ratio was changed to 10/3 (the total weight of $CeO_2$ and $CrO_2$:100 g).

EXAMPLE 5-12

A complete catalyst was obtained by following the procedure of Example 5-1, except that the $CeO_2/ZrO_2$ ratio was changed to 25/1 (the total weight of $CeO_2$ and $ZrO_2$:100 g).

EXAMPLE 5-13

A complete catalyst was obtained by following the procedure of Example 5-1, except that 35.3 g of magnesium acetate was used in the place of barium acetate.

EXAMPLE 5-14

A complete catalyst was obtained by following the procedure of Example 5-1, except that an aqueous palladium nitrate solution containing 2 g of palladium was used in the place of the aqueous palladium nitrate solution containing 4 g of palladium.

EXAMPLE 5-15

A complete catalyst was obtained by following the procedure of Example 5-1, except that an aqueous palladium nitrate solution containing 16 g of palladium was used in the place of the aqueous palladium nitrate solution containing 4 g of palladium.

EXAMPLE 5-16

A complete catalyst was obtained by following the procedure of Example 5-1, except that an aqueous palladium nitrate solution containing 40 g of palladium was used in the place of the aqueous palladium nitrate solution containing 4 g of palladium.

EXAMPLE 5-17

A complete catalyst was obtained by following the procedure of Example 5-1, except that a ratio of $CeO_2/ZrO_2$ was changed to 10/1 (total of $CeO_2$ and $ZrO_2$ was 260 g)

Control 5-1

A complete catalyst was obtained by following the procedure of Example 5-1, except that the use of silica was omitted.

Control 5-2

A complete catalyst was obtained by following the procedure of Example 5-1, except that the use of barium acetate was omitted.

Control 5-3

A complete catalyst was obtained by following the procedure of Example 5-1, except that the use of zirconyl oxynitrate was omitted.

Control 5-4

A complete catalyst was obtained by following the procedure of Example 5-1, except that the use of zirconyl oxynitrate, barium acetate, and silica was omitted.

Control 5-5

An aqueous platinum dinitrodiamine solution containing 2.25 g of platinum was mixed with an aqueous rhodium nitrate solution containing 0.22 g of rhodium. A powder was obtained by impregnating 200 g of the same activated alumina as used in Example 5-1 with the resultant mixed solution. A complete catalyst was obtained by wet pulverizing the powder with 100 g of the same cerium oxide as used in Example 5-1 in a ball mill and then treating the product of pulverization in the same manner as in Example 5-1.

Control 5-6

A powder was obtained by mixing an aqueous palladium nitrate solution containing 2.25 g of palladium with an aqueous rhodium nitrate solution containing 0.22 g of rhodium, immerging 200 g of the same activated alumina as used in Example 5-1 with the resultant mixed solution, drying the product of impregnation, and calcining the dried solid. A complete catalyst was produced by wet pulverizing the powder and 100 g of the same cerium oxide as used in Example 5-1 in a ball mill and treating the product of pulverization in the same manner as in Example 5-1.

Supporting amount of each catalytic components of the catalyst thus obtained in Examples and Controls per liter of the Catalyst are shown in Table 12.

EXAMPLE 5-18

Then, the catalysts of Examples 5-1 to 5-17 and the catalysts of Control 5-1 to 5-6 were tested for catalytic activity after an engine durability test in the same manner as in Example 3-21. The results are shown in Table 13.

TABLE 12

|  | Noble metal* | Alkaline earth metal oxide* | Silica | $CeO_2/ZrO_2$** | Total $CeO_2$ and $ZrO_2$* |
|---|---|---|---|---|---|
| Example 5-1 | Pd:2.0 | BaO:5.0 | 2.0 | 10/1 | 50 |
| Example 5-2 | Pd:2.0 | BaO:5.0 | 2.0 | 10/1 | 50 |
| Example 5-3 | Pd:2.0 | BaO:5.0 | 30.0 | 10/1 | 50 |
| Example 5-4 | Pd:2.0 | BaO:5.0 | 0.2 | 10/1 | 50 |
| Example 5-5 | Pd:2.0 | BaO:40.0 | 2.0 | 10/1 | 50 |
| Example 5-6 | Pd:2.0 | BaO:0.25 | 2.0 | 10/1 | 50 |
| Example 5-7 | Pd:2.0 | CaO:5.0 | 2.0 | 10/1 | 50 |
| Example 5-8 | Pd:2.0 | SrO:5.0 | 2.0 | 10/1 | 50 |
| Example 5-9 | Pd:2.0 | BaO:5.0 | 2.0 | 10/1 | 15 |
| Example 5-10 | Pd:2.0 | BaO:5.0 | 2.0 | 10/1 | 80 |
| Example 5-11 | Pd:2.0 | BaO:5.0 | 2.0 | 10/3 | 50 |
| Example 5-12 | Pd:2.0 | BaO:5.0 | 2.0 | 25/1 | 50 |
| Example 5-13 | Pd:2.0 | MgO:5.0 | 2.0 | 10/1 | 50 |
| Example 5-14 | Pd:1.0 | BaO:5.0 | 2.0 | 10/1 | 50 |
| Example 5-15 | Pd:8.0 | BaO:5.0 | 2.0 | 10/1 | 50 |
| Example 5-16 | Pd:20.0 | BaO:5.0 | 2.0 | 10/1 | 50 |
| Example 5-17 | Pd:2.0 | BaO:5.0 | 2.0 | 10/1. | 130 |
| Control 5-1 | Pd:2.0 | BaO:5.0 | — | 10/1 | 50 |
| Control 5-2 | Pd:2.0 | — | 2.0 | 1 | 50 |
| Control 5-3 | Pd:2.0 | BaO:5.0 | 2.0 | 10/— | 50 |
| Control 5-4 | Pd:2.0 | — | — | 10/— | 50 |
| Control 5-5 | Pt:1.125 Rh:0.11 | — | — | 10/— | 50 |
| Control 5-6 | Pd:1.125 Rh:0.11 | — | — | 10/— | 50 |

*Amount, g. carried per liter of catalyst
**weight ratio of oxides

TABLE 13

|  | Purifying ratio at crossover point (%) | | Purifying ratio at A/F of 13.8(%) | Light off temperature (°C.) | | |
|---|---|---|---|---|---|---|
|  | CO—NOx* | HC |  | CO | HC | NO |
| Example 5-1 | 85 | 92 | 80 | 356 | 370 | 377 |
| Example 5-2 | 85 | 92 | 80 | 365 | 369 | 376 |
| Example 5-3 | 86 | 93 | 82 | 364 | 368 | 375 |
| Example 5-4 | 84 | 92 | 79 | 370 | 374 | 381 |
| Example 5-5 | 88 | 93 | 81 | 358 | 362 | 368 |
| Example 5-6 | 85 | 91 | 75 | 375 | 379 | 388 |
| Example 5-7 | 85 | 92 | 80 | 366 | 370 | 377 |
| Example 5-8 | 84 | 92 | 80 | 367 | 371 | 378 |
| Example 5-9 | 82 | 89 | 80 | 386 | 390 | 367 |
| Example 5-10 | 88 | 93 | 81 | 355 | 359 | 365 |
| Example 5-11 | 85 | 92 | 80 | 366 | 370 | 377 |
| Example 5-12 | 85 | 92 | 80 | 367 | 371 | 378 |
| Example 5-13 | 80 | 90 | 75 | 385 | 389 | 396 |
| Example 5-14 | 77 | 86 | 72 | 398 | 402 | 409 |
| Example 5-15 | 95 | 96 | 90 | 332 | 336 | 327 |
| Example 5-16 | 100 | 100 | 95 | 290 | 292 | 302 |
| Example 5-17 | 89 | 94 | 82 | 350 | 354 | 360 |
| Control 5-1 | 78 | 88 | 67 | 396 | 400 | 407 |
| Control 5-2 | 51 | 73 | 25 | 411 | 419 | 402 |
| Control 5-3 | 70 | 81 | 67 | 405 | 413 | 396 |
| Control 5-4 | 51 | 73 | 25 | 412 | 419 | 402 |
| Control 5-5 | 73 | 83 | 65 | 401 | 410 | 398 |
| Control 5-6 | 68 | 80 | 50 | 411 | 420 | 403 |

*Magnitude of purging ratio at intersection between CO—NO; CO purging ratio curve and NO purging ratio curve

EXAMPLE 6-1

A powder of the amount 100 g was obtained by mixing a commercially available cerium oxide ($CeO_2$, specific surface area 149 m²/g) with an aqueous zirconyl oxynitrate solution at a $CeO_2/ZrO_2$ ratio of 10/1 (the total weight of $CeO_2$ and $ZrO_2$:100 g), drying the resultant mixture, and calcining the dried mixture at 500° C. for 1 hour. A water-soluble slurry was prepared by wet pulverizing in a ball mill the powder, 100 g of titanium oxide (specific surface area 50 m²/g), 100 g of activated alumina (γ-A1203, average particle diameter 45 μm, specific surface area 155 m²/g), 16.7 g of barium acetate, and an aqueous palladium nitrate solution containing 4 g of palladium. A monolithic carrier of cordierite (33 mm in outside diameter×76 mm in length) possessing 400 cells per square inch of cross-sectional area was immersed in the slurry, taken out of the slurry, blown with compressed air to expel the excess slurry remaining within the cells, dried, and calcined to obtain a complete catalyst.

EXAMPLE 6-2

A complete catalyst was obtained by following the procedure of Example 6-1, except that the amount of titanium oxide was changed to 20 g and the amount of the activated alumina was changed to 180 g.

EXAMPLE 6-3

A complete catalyst was obtained by following the procedure of Example 6-1, except that the amount of titanium oxide was changed to 180 g and the amount of the activated alumina was changed to 20 g.

EXAMPLE 6-4

A complete catalyst was obtained by following the procedure of Example 6-1, except that the specific surface area of titanium oxide was changed to 10 m$^2$/g.

EXAMPLE 6-5

A complete catalyst was obtained by following the procedure of Example 6-1, except that the amount of barium acetate was changed from 16.7 g to 133.6 g.

EXAMPLE 6—6

A complete catalyst was obtained by following the procedure of Example 6-1, except that the amount of barium acetate was changed from 16.7 g to 0.83 g.

EXAMPLE 6-7

A complete catalyst was obtained by following the procedure of Example 6-1, except that 28.2 g of calcium acetate was used in the place of barium acetate.

EXAMPLE 6-8

A complete catalyst was obtained by following the procedure of Example 6-1, except that 19.8 g of strontium acetate was used in the place of barium acetate.

EXAMPLE 6-9

A complete catalyst was obtained by following the procedure of Example 6-1, except that the CeO$_2$/ZrO$_2$ ratio was changed to 10/1 (the total weight of CeO$_2$ and ZrO$_2$:15 g).

EXAMPLE 6-10

A complete catalyst was obtained by following the procedure of Example 6-1, except that the CeO$_2$/ZrO$_2$ ratio was changed to 10/1 (the total weight of CeO$_2$ and ZrO$_2$:160 g).

EXAMPLE 6-11

A complete catalyst was obtained by following the procedure of Example 6-1, except that the CeO$_2$/ZrO$_2$ ratio was changed to 10/3 (the total weight of CeO$_2$ and ZrO$_2$:100 g).

EXAMPLE 6-12

A complete catalyst was obtained by following the procedure of Example 6-1, except that the CeO$_2$/ZrO$_2$ ratio was changed to 25/1 (the total weight of CeO$_2$ and ZrO$_2$:100 g).

EXAMPLE 6-13

A complete catalyst was obtained by following the procedure of Example 6-1, except that 35.3 g of magnesium acetate was used in the place of barium acetate.

EXAMPLE 6-14

A complete catalyst was obtained by following the procedure of Example 6-1, except that an aqueous palladium nitrate solution containing 2 g of palladium was used in the place of the aqueous palladium nitrate solution containing 4 g of palladium.

EXAMPLE 6-15

A complete catalyst was obtained by following the procedure of Example 6-1, except that an aqueous palladium nitrate solution containing 16 g of palladium was used in the place of the aqueous palladium nitrate solution containing 4 g of palladium.

EXAMPLE 6-16

A complete catalyst was obtained by following the procedure of Example 6-1, except that an aqueous palladium nitrate solution containing 40 g of palladium was used in the place of the aqueous palladium nitrate solution containing 4 g of palladium.

EXAMPLE 6-17

A complete catalyst was obtained by following the procedure of Example 6-1, except that a ratio of CeO$_2$/ZrO$_2$ was changed to 10/1 (total of CeO$_2$ and ZrO$_2$ was 260 g).

Control 6-1

A complete catalyst was obtained by following the procedure of Example 6-1, except that the use of barium acetate was omitted.

Control 6-2

A complete catalyst was obtained by following the procedure of Example 6-1, except that the use of titanium oxide was omitted.

Control 6-3

A complete catalyst was obtained by following the procedure of Example 6-1, except that the use of zirconyl oxynitrate was omitted.

Control 6-4

A powder was obtained by mixing an aqueous palladium nitrate solution containing 2.25 g of palladium with an aqueous rhodium nitrate solution containing 0.22 g of rhodium, immersing 200 g of the same activated alumina as used in Example 6-1 in the resultant mixed solution, drying the product of immersion, and calcining the dried solid. A complete catalyst was produced by wet pulverizing the powder and 100 g of the same cerium oxide as used in Example 6-1 in a ball mill and treating the product of pulverization in the same manner as in Example 6-1.

Control 6-5

A powder was obtained by mixing an aqueous platinum dinitrodiamine solution containing 2.25 g of platinum with an aqueous rhodium nitrate solution containing 0.22 g of rhodium and impregnating 200 g of the same activated alumina as used in Example 6-1 with the resultant mixed solution. A complete catalyst was produced by wet pulverizing the powder and 100 g of the same cerium oxide as used in Example 6-1 in a ball mill and treating the product of pulverization in the same manner as in Example 6-1.

Supporting amount of each catalytic components of the catalyst thus obtained in Examples and Controls per liter of the catalyst are shown in Table 14.

EXAMPLE 6-18

The catalysts of Examples 6-1 to 6-17 and the catalysts of Controls 6-1 to 6-5 were tested for catalytic activity after an engine durability test in the same manner as in Example 3-21. The results are shown in Table 15.

TABLE 14

|  | Noble metal* | Alkaline earth metal oxide* | Titanium oxide* | $CeO_2/ZrO_2$** | Total $CeO_2$ and $ZrO_2$* |
|---|---|---|---|---|---|
| Example 6-1 | Pd:2.0 | BaO:5.0 | 50 | 10/1 | 50 |
| Example 6-2 | Pd:2.0 | BaO:5.0 | 10 | 10/1 | 50 |
| Example 6-3 | Pd:2.0 | BaO:5.0 | 90 | 10/1 | 50 |
| Example 6-4 | Pd:2.0 | BaO:5.0 | 50 | 10/1 | 50 |
| Example 6-5 | Pd:2.0 | BaO:40.0 | 50 | 10/1 | 50 |
| Example 6-6 | Pd:2.0 | BaO:0.25 | 50 | 10/1 | 50 |
| Example 6-7 | Pd:2.0 | CaO:5.0 | 50 | 10/1 | 50 |
| Example 6-8 | Pd:2.0 | SrO:5.0 | 50 | 10/1 | 50 |
| Example 6-9 | Pd:2.0 | BaO:5.0 | 50 | 10/1 | 15 |
| Example 6-10 | Pd:2.0 | BaO:5.0 | 50 | 10/1 | 80 |
| Example 6-11 | Pd:2.0 | BaO:5.0 | 50 | 10/3 | 50 |
| Example 6-12 | Pd:2.0 | BaO:5.0 | 50 | 25/1 | 50 |
| Example 6-13 | Pd:2.0 | MgO:5.0 | 50 | 10/1 | 50 |
| Example 6-14 | Pd:1.0 | BaO:5.0 | 50 | 10/1 | 50 |
| Example 6-15 | Pd:8.0 | BaO:5.0 | 50 | 10/1 | 50 |
| Example 6-16 | Pd:20.0 | BaO:5.0 | 50 | 10/1 | 50 |
| Example 6-17 | Pd:2.0 | BaO:5.0 | 50 | 10/ | 130 |
| Control 6-1 | Pd:2.0 | — | 50 | 10/1 | 50 |
| Control 6-2 | Pd:2.0 | — | — 10/— | 50 | |
| Control 6-3 | Pd:2.0 | BaO:5.0 | 50 | 10/— | 50 |
| Control 6-4 | Pd:1.125 Rh:0.11 | — | — | 10/1 | 50 |
| Control 6-5 | Pd:1.125 Rh:0.11 | — | — | 10/— | 50 |

*Amount. g. carried per liter of catalyst
**Weight ratio of oxides

TABLE 15

|  | Purifying ratio at crossover point (%) | | Purifying ratio at A/F of 13.8(%) | Light off temperature (°C.) | | |
|---|---|---|---|---|---|---|
|  | CO—NO* | HC | HC | CO | HC | NO |
| Example 6-1 | 88 | 92 | 75 | 356 | 360 | 367 |
| Example 6-2 | 82 | 90 | 72 | 376 | 380 | 387 |
| Example 6-3 | 89 | 92 | 76 | 355 | 360 | 367 |
| Example 6-4 | 88 | 92 | 76 | 355 | 360 | 367 |
| Example 6-5 | 87 | 92 | 78 | 357 | 361 | 367 |
| Example 6-6 | 87 | 92 | 72 | 360 | 364 | 370 |
| Example 6-7 | 87 | 92 | 74 | 356 | 360 | 367 |
| Example 6-8 | 88 | 92 | 75 | 356 | 359 | 366 |
| Example 6-9 | 84 | 90 | 73 | 366 | 370 | 377 |
| Example 6-10 | 88 | 92 | 74 | 356 | 361 | 367 |
| Example 6-11 | 87 | 92 | 74 | 358 | 362 | 369 |
| Example 6-12 | 86 | 91 | 74 | 357 | 361 | 368 |
| Example 6-13 | 87 | 92 | 70 | 359 | 363 | 370 |
| Example 6-14 | 79 | 87 | 70 | 399 | 403 | 410 |
| Example 6-15 | 95 | 96 | 88 | 332 | 336 | 327 |
| Example 6-16 | 100 | 100 | 92 | 290 | 291 | 301 |
| Example 6-17 | 89 | 93 | 75 | 351 | 356 | 362 |
| Control 6-1 | 82 | 90 | 24 | 411 | 419 | 401 |
| Control 6-2 | 78 | 88 | 67 | 396 | 400 | 407 |
| Control 6-3 | 80 | 89 | 67 | 399 | 401 | 408 |
| Control 6-4 | 73 | 83 | 65 | 401 | 410 | 398 |
| Control 6-5 | 68 | 80 | 50 | 401 | 410 | 398 |

*Magnitude of purging ratio at intersection between CO—NO: CO purging ratio curve and NO purging ratio curve

EXAMPLE 7-1

A powder ($CeO_2$ $ZrO_2$) of the amount 100 g was obtained by mixing a commercially available cerium oxide ($CeO_2$, specific surface area 149 m2/g) with an aqueous zirconyl oxynitrate solution at a $CeO_2/ZrO_2$ ratio of 10/1 (the total weight of $CeO_2$ and $ZrO_2$:100 g), drying the resultant mixture, and calcining the dried mixture at 500° C. for 1 hour. An aqueous slurry was prepared by wet pulverizing in a ball mill this powder, 100 g of titanium oxide (specific surface area 50 m2/g), 96 g of activated alumina ($\gamma$-A1203, average particle diameter 45 $\mu$m, and specific surface area 155 m2/g), an aqueous silica sol containing 4 g as silica, an aqueous palladium nitrate solution containing 4 g of palladium, and 16.7 g of barium acetate. A monolithic carrier of cordierite (33 mm in outside diameter and 76 mm in length) possessing 400 cells per square inch of cross-sectional area was immersed in the slurry, taken out of the slurry, blown with compressed air to expel the excess slurry retained within the cells, dried, and calcined to obtain a complete catalyst.

EXAMPLE 7-2

A complete catalyst was obtained by following the procedure of Example 7-1, except that the amount of titanium oxide was changed to 20 g and the amount of the activated aluminum was changed to 176 g.

EXAMPLE 7-3

A complete catalyst was obtained by following the procedure of Example 7-1, except that the amount of titanium oxide was changed to 180 g and the amount of the activated alumina was changed to 16 g.

EXAMPLE 7-4

A complete catalyst was obtained by following the procedure of Example 7-1, except that titanium oxide (specific surface area:10 m2/g) was used in the place of titanium oxide (specific surface area:50 m2/g).

EXAMPLE 7-5

A complete catalyst was obtained by following the procedure of Example 7-1, except that the amount of silica was changed to 60 g and the amount of the activated alumina was changed to 36 g.

EXAMPLE 7-6

A complete catalyst was obtained by following the procedure of Example 7-1, except that the amount of silica was changed to 0.4 g and the amount of the activated alumina was changed to 99.6 g.

EXAMPLE 7—7

A complete catalyst was obtained by following the procedure of Example 7-1, except that the amount of barium acetate was changed from 16.7 g to 133.6 g.

EXAMPLE 7-8

A complete catalyst was obtained by following the procedure of Example 7-1, except that the amount of barium acetate was changed from 16.7 g to 0.83 g.

EXAMPLE 7-9

A complete catalyst was obtained by following the procedure of Example 7-1, except that 28.2 g of calcium acetate was used in the place of barium acetate.

EXAMPLE 7-10

A complete catalyst was obtained by following the procedure of Example 7-1, except that 19.8 g of strontium acetate was used in the place of barium acetate.

EXAMPLE 7-11

A complete catalyst was obtained by following the procedure of Example 7-1, except that the $CeO_2/ZrO_2$ ratio was changed to 10/1 (the total weight of $CeO_2$ and $ZrO_2$:30 g).

EXAMPLE 7-12

A complete catalyst was obtained by following the procedure of Example 7-1, except that the $CeO_2/ZrO_2$ ratio L was changed to 10/1 (the total weight of $CeO_2$ and $ZrO_2$:160 g).

EXAMPLE 7-13

A complete catalyst was obtained by following the procedure of Example 7-1, except that the $CeO_2/ZrO_2$ ratio was changed to 10/3 (the total weight of $CeO_2$ and $ZrO_2$:100 g).

EXAMPLE 7-14

A complete catalyst was obtained by following the procedure of Example 7-1, except that the $CeO_2/ZrO_2$ ratio was changed to 25/1 (the total weight of $CeO_2$ and $ZrO_2$:100 g).

EXAMPLE 7-15

A complete catalyst was obtained by following the procedure of Example 7-1, except that 35.3 g of magnesium acetate was used in the place of barium acetate.

EXAMPLE 7-16

A complete catalyst was obtained by following the procedure of Example 7-1, except that an aqueous palladium nitrate solution containing 2 g of palladium was used in the place of the aqueous palladium nitrate solution containing 4 g of palladium.

EXAMPLE 7-17

A complete catalyst was obtained by following the procedure of Example 7-1, except that an aqueous palladium nitrate solution containing 16 g of palladium was used in the place of the aqueous palladium nitrate solution containing 16 g of palladium.

EXAMPLE 7-18

A complete catalyst was obtained by following the procedure of Example 7-1, except that an aqueous palladium nitrate solution containing 40 g of palladium was used in the place of the aqueous palladium nitrate solution containing 4 g of palladium.

EXAMPLE 7-19

A complete catalyst was obtained by following the procedure of Example 7-1, except that a ratio of $CeO_2/ZrO_2$ was changed to 10/1 ( total of $CeO_2$ and $ZrO_2$ was 260 g ).

Control 7-1

A complete catalyst was obtained by following the procedure of Example 7-1, except that the use of barium acetate was omitted.

Control 7-2

A complete catalyst was obtained by following the procedure of Example 7-1, except that the use of titanium oxide was omitted.

Control 7-3

A complete catalyst was obtained by following the procedure of Example 7-1, except that the use of silica was omitted.

Control 7-4

A complete catalyst was obtained by following the procedure of Example 7-1, except that the use of zirconyl oxynitrate was omitted.

Control 7-5

A powder was obtained by mixing an aqueous palladium nitrate solution containing 2.25 g of palladium with an aqueous rhodium nitrate solution containing 0.22 g of rhodium, impregnating 200 g of the same activated alumina as used in Example 7-1 with the resultant mixed solution, drying the product of impregnation, and calcining the dried solid. A complete catalyst was produced by wet pulverizing in a ball mill the powder and 100 g of the same cerium oxide as used in Example 7-1 and treating the product of pulverization in the same manner as in Example 7-1.

Control 7-6

A powder was obtained by mixing an aqueous platinum dinitrodiamine solution containing 2.25 g of platinum with an aqueous rhodium nitrate solution containing 0.22 g of rhodium and impregnating 100 g of the same activated alumina as used in Example 7-1 with the resultant mixed solution. A complete catalyst was obtained by wet pulverizing in a ball mill the powder and 100 g of the same cerium oxide as used in Example 7-1 and treating the product of pulverization in the same manner as in Example 7-1.

Supporting amount of each catalytic components of the catalyst thus obtained in Examples and Controls per liter of the catalyst are shown in Table 16.

EXAMPLE 7-20

The catalysts of Examples 7-1 to 7-19 and the catalysts of Controls 7-1 to 7-6 were tested for catalytic activity after an engine durability test in the same manner as in Examples 3-21. The results are shown in Table 17.

TABLE 16

| | Noble metal* | Alkaline earth metal oxide* | titanium oxide* | Silica* | $CeO_2/ZrO_2$** | Total $CeO_2$ and $ZrO_2$* |
|---|---|---|---|---|---|---|
| Example 7-1 | Pd:2.0 | BaO:5.0 | 50 | 2 | 10/1 | 50 |
| Example 7-2 | Pd:2.0 | BaO:5.0 | 10 | 2 | 10/1 | 50 |
| Example 7-3 | Pd:2.0 | BaO:5.0 | 90 | 2 | 10/1 | 50 |
| Example 7-4 | Pd:2.0 | BaO:5.0 | 50 | 2 | 10/1 | 50 |
| Example 7-5 | Pd:2.0 | BaO:5.0 | 50 | 30 | 10/1 | 50 |
| Example 7-6 | Pd:2.0 | BaO:5.0 | 50 | 0.2 | 10/1 | 50 |
| Example 7-7 | Pd:2.0 | BaO:40.0 | 50 | 2.0 | 10/1 | 50 |
| Example 7-8 | Pd:2.0 | BaO:0.25 | 50 | 2.0 | 10/1 | 50 |
| Example 7-9 | Pd:2.0 | CaO:5.0 | 50 | 2.0 | 10/1 | 50 |
| Example 7-10 | Pd:2.0 | SrO:5.0 | 50 | 2.0 | 10/1 | 50 |
| Example 7-11 | Pd:2.0 | BaO:5.0 | 50 | 2.0 | 10/1 | 15 |
| Example 7-12 | Pd:2.0 | BaO:5.0 | 50 | 2.0 | 10/1 | 80 |
| Example 7-13 | Pd:2.0 | BaO:5.0 | 50 | 2.0 | 10/3 | 50 |
| Example 7-14 | Pd:2.0 | BaO:5.0 | 50 | 2.0 | 25/1 | 50 |
| Example 7-15 | Pd:2.0 | MgO:5.0 | 50 | 2.0 | 10/1 | 50 |
| Example 7-16 | Pd:1.0 | BaO:5.0 | 50 | 2.0 | 10/1 | 50 |
| Example 7-17 | Pd:8.0 | BaO:5.0 | 50 | 2.0 | 10/1 | 50 |
| Example 7-18 | Pd:20.0 | BaO:5.0 | 50 | 2.0 | 10/1 | 50 |
| Example 7-19 | Pd:2.0 | BaO:5.0 | 50 | 2 | 10/1 | 130 |
| Control 7-1 | Pd:2.0 | — | 50 | 2 | 10/1 | 50 |
| Control 7-2 | Pd:2.0 | BaO:5.0 | — | 2 | 10/1 | 50 |
| Control 7-3 | Pd:2.0 | BaO:5.0 | 50 | — | 10/1 | 50 |
| Control 7-4 | Pd:2.0 | BaO:5.0 | 50 | 2 | 10/— | 50 |
| Control 7-5 | Pd:1.125 Ph:0.11 | — | — | — | 10/— | 50 |
| Control 7-6 | Pt:1.125 Ph:0.11 | — | — | — | 10/— | 50 |

*Amount, g, carried per liter of catalyst
**Weight ratio of oxides

TABLE 17

| | Purifying ratio at crossover point (%) CO—NO* | Purifying ratio at A/F of 13.8(%) HC | Light off temperature (°C.) CO | HC | NO |
|---|---|---|---|---|---|
| Example 7-1 | 89 | 92 | 80 | 350 | 354 | 361 |
| Example 7-2 | 84 | 90 | 79 | 370 | 374 | 381 |
| Example 7-3 | 91 | 93 | 82 | 349 | 353 | 360 |
| Example 7-4 | 89 | 92 | 80 | 350 | 354 | 361 |
| Example 7-5 | 89 | 92 | 82 | 351 | 355 | 362 |
| Example 7-6 | 89 | 92 | 79 | 350 | 354 | 362 |
| Example 7-7 | 89 | 92 | 80 | 352 | 356 | 383 |
| Example 7-8 | 88 | 92 | 78 | 353 | 357 | 364 |
| Example 7-9 | 89 | 92 | 80 | 350 | 354 | 361 |
| Example 7-10 | 89 | 92 | 80 | 350 | 354 | 351 |
| Example 7-11 | 85 | 90 | 78 | 360 | 364 | 371 |
| Example 7-12 | 89 | 92 | 80 | 348 | 352 | 359 |
| Example 7-13 | 87 | 91 | 79 | 352 | 355 | 363 |
| Example 7-14 | 88 | 92 | 80 | 350 | 354 | 361 |
| Example 7-15 | 87 | 90 | 75 | 355 | 359 | 366 |
| Example 7-16 | 80 | 87 | 73 | 393 | 397 | 405 |
| Example 7-17 | 95 | 96 | 89 | 328 | 332 | 322 |
| Example 7-18 | 100 | 100 | 93 | 284 | 286 | 295 |
| Example 7-19 | 90 | 93 | 81 | 345 | 349 | 356 |
| Control 7-1 | 85 | 89 | 25 | 411 | 419 | 401 |
| Control 7-2 | 85 | 92 | 80 | 366 | 370 | 377 |
| Control 7-3 | 88 | 92 | 74 | 356 | 360 | 367 |
| Control 7-4 | 80 | 89 | 73 | 398 | 400 | 407 |
| Control 7-5 | 73 | 83 | 65 | 401 | 410 | 398 |
| Control 7-6 | 68 | 80 | 50 | 411 | 420 | 403 |

Magnitude of purifying ratio at intersection between CO—NOx; CO purging ratio curve and NOx purifying ratio curve

EXAMPLE 8-1

A powder of the amount 100 g was obtained by mixing a commercially available cerium oxide ($CeO_2$, specific surface area 149 $m^2/g$) with an aqueous zirconyl oxynitrate solution in a $CeO_2/ZrO_2$ ratio of 10/1 (the total weight of $CeO_2$ and $ZrO_2$:100 g), drying the resultant mixture, and calcining the dried mixture at 500° C. for one hour. This powder and 190 g of an activated alumina ($\gamma$-$Al_2O_3$, average particle diameter 45 $\mu$m, and specific surface area 155 $m^2/g$) were immersed in an aqueous ferric nitrate solution containing 10 g as iron oxide. The product of immersion was dried and calcined at 500° C. for 1 hour. A water-soluble slurry was prepared by wet pulverizing in a ball mill the resultant powder, 16.7 g of barium acetate, and an aqueous palladium nitrate solution containing 4 g of palladium. A monolithic carrier of cordierite (33 mm in outside diameter×76 mm in length) possessing 400 cells per square inch of cross-sectional area was immersed in the slurry, taken out of the slurry, blown with compressed air to expel the excessive slurry remaining within the cells, then dried, and calcined, to produce a complete catalyst.

EXAMPLE 8-2

A complete catalyst was obtained by following the procedure of Example 8-1, except that cotalt nitrate (10 g as cobalt oxide) was used in the place of the ferric nitrate (10 g as iron oxide).

EXAMPLE 8-3

A complete catalyst was obtained by following the procedure of Example 8-1, except that nickel nitrate (10 g as nickel oxide) was used in the place of the ferric nitrate (10 g as iron oxide).

EXAMPLE 8-4

A complete catalyst was obtained by following the procedure of Example 8-1, except that ferric nitrate (0.2 g as iron oxide) was used in the place of the ferric nitrate (10 g as iron oxide).

EXAMPLE 8-5

A complete catalyst was obtained by following the procedure of Example 8-1, except that ferric nitrate (40 g as iron oxide) was used in the place of the ferric nitrate (10 g as iron oxide).

EXAMPLE 8-6

A complete catalyst was obtained by following the procedure of Example 8-1, except that the amount of barium acetate was changed from 16.7 g to 133.6 g.

EXAMPLE 8-7

A complete catalyst was obtained by following the procedure of Example 8-1, except that the amount of barium acetate was changed from 16.7 g to 0.83 g.

EXAMPLE 8—8

A complete catalyst was obtained by following the procedure of Example 8-1, except that 28.2 g of calcium acetate was used in the place of barium acetate.

EXAMPLE 8-9

A complete catalyst was obtained by following the procedure of Example 8-1, except that 19.8 g of strontium acetate was used in the place of barium acetate.

EXAMPLE 8-10

A complete catalyst was obtained by following the procedure of Example 8-1, except that the $CeO_2/ZrO_2$ ratio was changed to 10/1 (the total weight of $CeO_2$ and $ZrO_2$:30 g).

EXAMPLE 8-11

A complete catalyst was obtained by following the procedure of Example 8-1, except that the $CeO_2/ZrO_2$ ratio was changed to 10/1 (the total weight of $CeO_2$ and $ZrO_2$:160 g).

EXAMPLE 8-12

A complete catalyst was obtained by following the procedure of Example 8-1, except that the $CeO_2/ZrO_2$ ratio was changed to 10/3 (the total weight of $CeO_2$ and $ZrO_2$:100 g).

EXAMPLE 8-13

A complete catalyst was obtained by following the procedure of Example 8-1, except that the $CeO_2/ZrO_2$ ratio was changed to 25/1 (the total weight of $CeO_2$ and $ZrO_2$:100 g).

EXAMPLE 8-14

A complete catalyst was obtained by following the procedure of Example 8-1, except that an aqueous palladium nitrate solution containing 2 g of palladium was used in the place of the aqueous palladium nitrate solution containing 4 g of palladium.

EXAMPLE 8-15

A complete catalyst was obtained by following the procedure of Example 8-1, excepting an aqueous palladium nitrate solution containing 16 g of palladium was used in the place of the aqueous palladium nitrate solution containing 4 g of palladium.

EXAMPLE 8-16

A complete catalyst was obtained by following the procedure of Example 8-1, except that an aqueous palladium nitrate solution containing 40 g of palladium was used in the place of the aqueous palladium nitrate solution containing 4 g of palladium.

EXAMPLE 8-17

A complete catalyst was obtained by the following procedure of Example 8-1, except that ratio of $CeO_2/ZrO_2$ was changed to 10/1 (Total of $CeO_2$ and $ZrO_2$ was 260 g).

Control 8-1

A complete catalyst was obtained by following the procedure of Example 8-1, except that the use of iron oxide was omitted.

Control 8-2

A complete catalyst was obtained by following the procedure of Example 8-1, except that the use of barium acetate was omitted.

Control 8-3

A complete catalyst was obtained by following the procedure of Example 8-1, except that the use of zirconyl oxynitrate was omitted.

Control 8-4

A powder was obtained by mixing an aqueous palladium nitrate solution containing 2.25 g of palladium with an aqueous rhodium nitrate solution containing 0.22 g of rhodium, impregnating 200 g of the same activated alumina as used in Example 8-1 with the resultant mixed solution, drying the product of immersion, and calcining the dried solid. A complete catalyst was obtained by wet pulverizing in a ball mill the resultant powder and 100 g of the same cerium oxide as used in Example 8-1 and treating the product of pulverization in the same manner as in Example 8-1.

Control 8-5

A powder was obtained by mixing an aqueous platinum dinitrodiamine solution containing 2.25 g of platinum with an aqueous rhodium nitrate solution containing 0.22 g of rhodium and impregnating 200 g of the same activated alumina as used in Example 8-1 with the resultant mixed solution. A complete catalyst was produced by wet pulverizing in a ball mill the powder and 100 g of the same cerium oxide as used in Example 8-1 and treating the product of pulverization in the same manner as in Example 8-1.

Supporting amount of each catalytic components of the catalyst thus obtained in Examples and Controls per liter of the catalyst are shown in Table 18.

EXAMPLE 8-18

The catalysts obtained in Examples 8-1 to 8-17 and the catalysts obtained in Controls 8-1 to 8-5 were tested for catalytic activity after an engine durability test in the same manner as in Example 3-21. The results are shown in Table 19.

TABLE 18

|  | Noble metal* | Alkaline earth metal oxide* | Additive (oxide)* | $CeO_2/ZrO_2$** | Total $CeO_2$ and $ZrO_2$* |
|---|---|---|---|---|---|
| Example 8-1 | Pd:2.0 | BaO:5.0 | Fe:5.0 | 10/1 | 50 |
| Example 8-2 | Pd:2.0 | BaO:5.0 | Co:5.0 | 10/1 | 50 |
| Example 8-3 | Pd:2.0 | BaO:5.0 | Ni:5.0 | 10/1 | 50 |

TABLE 18-continued

|  | Noble metal* | Alkaline earth metal oxide* | Additive (oxide)* | $CeO_2/ZrO_2$** | Total $CeO_2$ and $ZrO_2$* |
|---|---|---|---|---|---|
| Example 8-4 | Pd:2.0 | BaO:5.0 | Fe:0.1 | 10/1 | 50 |
| Example 8-5 | Pd:2.0 | BaO:5.0 | Fe:20.0 | 10/1 | 50 |
| Example 8-6 | Pd:2.0 | BaO:40.0 | Fe:5.0 | 10/1 | 50 |
| Example 8-7 | Pd:2.0 | BaO:0.25 | Fe:5.0 | 10/1 | 50 |
| Example 8-8 | Pd:2.0 | CaO:5.0 | Fe:5.0 | 10/1 | 50 |
| Example 8-9 | Pd:2.0 | SrO:5.0 | Fe:5.0 | 10/1 | 50 |
| Example 8-10 | Pd:2.0 | BaO:5.0 | Fe:5.0 | 10/1 | 15 |
| Example 8-11 | Pd:2.0 | BaO:5.0 | Fe:5.0 | 10/1 | 80 |
| Example 8-12 | Pd:2.0 | BaO:5.0 | Fe:5.0 | 10/3 | 50 |
| Example 8-13 | Pd:2.0 | BaO:5.0 | Fe:5.0 | 25/1 | 50 |
| Example 8-14 | Pd:1.0 | BaO:5.0 | Fe:5.0 | 10/1 | 50 |
| Example 8-15 | Pd:8.0 | BaO:5.0 | Fe:5.0 | 10/1 | 50 |
| Example 8-16 | Pd:20.0 | BaO:5.0 | Fe:5.0 | 10/1 | 50 |
| Example 8-17 | Pd:2.0 | BaO:5.0 | Fe:5.0 | 10/1 | 130 |
| Control 8-1 | Pd:2.0 | BaO:5.0 | — | 10/1 | 50 |
| Control 8-2 | Pd:2.0 | — | Fe:5.0 | 10/1 | 50 |
| Control 8-3 | Pd:2.0 | BaO:5.0 | Fe:5.0 | 10/— | 50 |
| Control 8-4 | Pd:1.125 Ph:0.11 | — | — | 10/— | 50 |
| Control 8-5 | Pd:1.125 Ph:0.11 | — | — | 10/— | 50 |

*Amount, g. carried per liter of catalyst
**Weight ratio of oxides

TABLE 19

|  | Purifying ratio at crossover point (%) | | Purifying ratio at A/F of 13.8(%) | Light off temperature (°C.) | | |
|---|---|---|---|---|---|---|
|  | CO—NO* | HC | HC | CO | HC | NO |
| Example 8-1 | 84 | 91 | 79 | 358 | 372 | 379 |
| Example 8-2 | 84 | 92 | 78 | 360 | 373 | 380 |
| Example 8-3 | 84 | 91 | 78 | 358 | 372 | 379 |
| Example 8-4 | 84 | 91 | 75 | 359 | 372 | 379 |
| Example 8-5 | 85 | 92 | 80 | 356 | 370 | 377 |
| Example 8-6 | 85 | 92 | 81 | 357 | 371 | 378 |
| Example 8-7 | 84 | 91 | 75 | 358 | 372 | 380 |
| Example 8-8 | 84 | 91 | 78 | 358 | 372 | 379 |
| Example 8-9 | 84 | 91 | 78 | 358 | 371 | 380 |
| Example 8-10 | 81 | 90 | 79 | 388 | 392 | 390 |
| Example 8-11 | 85 | 92 | 79 | 356 | 370 | 378 |
| Example 8-12 | 84 | 92 | 79 | 358 | 371 | 379 |
| Example 8-13 | 83 | 92 | 78 | 360 | 373 | 380 |
| Example 8-14 | 77 | 86 | 75 | 399 | 401 | 407 |
| Example 8-15 | 94 | 95 | 88 | 334 | 338 | 329 |
| Example 8-16 | 100 | 100 | 95 | 292 | 294 | 304 |
| Example 8-17 | 87 | 93 | 80 | 353 | 367 | 375 |
| Control 8-1 | 78 | 88 | 67 | 396 | 400 | 407 |
| Control 8-2 | 50 | 72 | 24 | 413 | 421 | 404 |
| Control 8-3 | 70 | 81 | 66 | 405 | 413 | 396 |
| Control 8-4 | 73 | 83 | 65 | 401 | 410 | 398 |
| Control 8-5 | 68 | 80 | 50 | 411 | 420 | 403 |

*Magnitude of purifying ratio at intersection between CO-NOx: CO purifying ratio curve and NOx purifying ratio curve

EXAMPLE 9-1

Catalyst on exhaust gas inlet side:

A powder of the amount 200 g was obtained by mixing a commercially available cerium oxide ($CeO_2$, specific surface area 149 m²/g) with an aqueous zirconyl oxynitrate solution in a $CeO_2/ZrO_2$ ratio of 10/1 (total weight of $CeO_2$ and $ZrO_2$:100 g), drying the resultant mixture, and calicining the dried mixture at 500° C. for 1 hour. An aqueous slurry was prepared by wet pulverizing in a ball mill the powder, 400 g of activated alumina ($\gamma$-$Al_2O_3$, average particle diameter 45 μm, and specific surface area 155 m²/g), 33.4 g of barium acetate, and an aqueous palladium nitrate solution containing 12 g of palladium. A complete catalyst was produced by immersing 0.5 liter of monolithic carrier of cordierite possessing 400 cells per square inch of cross-sectional area in the slurry, removing the carrier, blowing the wet carrier thereby expelling the excessive slurry remaining within the cells, drying the carrier, and calcining the dried carrier.

Catalyst on exhaust gas outlet side:

A powder was obtained by impregnating 400 g of an activated alumina ($\gamma$-$Al_2O_3$, average particle diameter 45 μm, and specific surface area 155 m²/g) with an aqueous nitric acid solution of platinum dinitrodiamine containing 3.33 g of platinum and rhodium nitrate containing 0.667 g of rhodium, drying the product of impregnation, and firing the dried solid at 400° C. for two hours. An aqueous slurry was prepared by wet pulverizing in a ball mill the powder and 200 g of a commercially available cerium oxide ($CeO_2$, specific surface area 149 m²/g). A complete catalyst was produced by immersing 0.5 liter of monolithic carrier of cordierite possessing 400 cells per square inch of crosssectional area, removing the carrier, blowing the wet carrier with compressed air thereby expelling the excessive slurry remaining within the cells, drying the wet carrier, and calcining the dried carrier.

EXAMPLE 9-2

A complete catalyst was obtained by following the procedure of Example 9-1, except that the amount of the barium acetate in the exhaust gas inlet side catalyst was changed from 33.4 g to 267.2 g.

EXAMPLE 9-3

A complete catalyst was obtained by following the procedure of Example 9-1, except that the amount of the barium acetate in the exhaust gas inlet side catalyst was changed from 33.4 g to 1.66 g.

EXAMPLE 9-4

A complete catalyst was obtained by following the procedure of Example 9-1, except that 56.4 g of calcium acetate was used in the place of the barium acetate in the exhaust gas inlet side catalyst.

EXAMPLE 9-5

A complete catalyst was obtained by following the procedure of Example 9-1, except that 39.6 g of strontium acetate was used in the place of the barium acetate in the exhaust gas inlet side catalyst.

EXAMPLE 9-6

A complete catalyst was obtained by following the procedure of Example 9-1, except that the $CeO_2/ZrO_2$ ratio in the exhaust gas inlet side catalyst was changed to 10/1 (the total weight of $CeO_2$ and $ZrO_2$:60 g) and the amount of the activated alumina was changed to 540 g.

EXAMPLE 9-7

A complete catalyst was obtained by following the procedure of Example 9-1, excepting the $CeO_2/ZrO_2$ ratio in the exhaust gas inlet side catalyst was changed to 10/1 (the total weight of $CeO_2$ and $ZrO_2$:320 g) and the amount of the activated alumina was changed to 280 g.

EXAMPLE 9-8

A complete catalyst was obtained by following the procedure of Example 9-1, excepting the $CeO_2/ZrO_2$ ratio in the exhaust gas inlet side catalyst was changed to 10/3 (the total weight of $CeO_2$ and $ZrO_2$:200 g).

EXAMPLE 9—9

A complete catalyst was obtained by following the procedure of Example 9-1, except that the $CeO_2/ZrO_2$ ratio in the exhaust gas inlet side catalyst was changed to 25/1 (the total weight of $CeO_2$ and $ZrO_2$:100 g).

EXAMPLE 9-10

A complete catalyst was obtained by following the procedure of Example 19-1, except that 70.6 g of magnesium acetate was used in the place of the barium acetate in the exhaust gas inlet side catalyst.

EXAMPLE 9-11

A complete catalyst was obtained by following the procedure of Example 9-1, except that an aqueous palladium nitrate solution containing 4 g of palladium was used in the place of the aqueous palladium nitrate solution containing 12 g of palladium in the exhaust gas inlet side catalyst.

EXAMPLE 9-12

A complete catalyst was obtained by following the procedure of Example 9-1, except that an aqueous palladium nitrate solution containing 32 g of palladium was used in the place of the aqueous palladium nitrate solution containing 12 g of palladium in the exhaust gas inlet side catalyst.

EXAMPLE 9-13

A complete catalyst was obtained by following the procedure of Example 9-1, except that an aqueous palladium nitrate solution containing 80 g of palladium was used in the place of the aqueous palladium nitrate solution containing 12 g of palladium in the exhaust gas inlet side catalyst.

EXAMPLE 9-14

A complete catalyst was obtained by following the procedure of Example 9-1, except that an aqueous nitric acid solution of platinum dinitrodiamine containing 1.67 g of platinum and palladnium nitrate containing 1.67 g of palladium were used in the place of 3.33 g of platinum in the exhaust gas outlet side catalyst.

EXAMPLE 9-15

A complete catalyst was obtained by following the procedure of Example 9-1, except that a ratio of $CeO_2/ZrO_2$ was changed to 10/1 (total of $CeO_2$ and $ZrO_2$ was 520 g) and amount of activated alumina was 80 g.

Control 9-1

The procedure of Example 9-1 was repeated, except that the exhaust gas inlet side catalyst was equalized with the exhaust gas outlet side catalyst.

Control 9-2

A complete catalyst was obtained by following the procedure of Example 9-1, except that the use of barium aceatate in the exhaust gas inlet side catalyst was omitted.

Control 9-3

A complete catalyst was obtained by following the procedure of Example 9-1, except that the use of zirconyl oxynitrate in the exhaust gas inlet side catalyst was omitted.

Control 9-4

A complete catalyst was obtained by following the procedure of Example 9-1, except that the use of zirconyl oxynitrate and the use of barium acetate in the exhaust gas inlet side catalyst were omitted.

Supporting amount of each catalytic components of the catalyst thus obtained in Example and Controls per liter of the catalyst are shown in Table 20.

EXAMPLE 9-16

The catalysts of Examples 9-1 to 9-15 and the catalysts of Controls 9-1 to 9-4 were tested for catalytic activity after an engine durability test in the same manner as in Example 3-21. The results are shown in Table 21.

TABLE 20

|  | Catalyst in exhaust gas inlet side | | | | Catalyst in exhaust gas outlet side | |
| --- | --- | --- | --- | --- | --- | --- |
|  | Noble metal* | Alkaline earth metal oxide* | $CeO_2/ZrO_2$** | Total $CeO_2$ and $ZrO_2$* | Noble metal* | $CeO_2$* |
| Example 9-1 | Pd:3.0 | BaO:5.0 | 10/1 | 50 | Pt:0.83, Rh:0.167 | 50 |
| Example 9-2 | Pd:3.0 | BaO:40 | 10/1 | 50 | Pt:0.83, Rh:0.167 | 50 |
| Example 9-3 | Pd:3.0 | BaO:0.25 | 10/1 | 50 | Pt:0.83, Rh:0.167 | 50 |
| Example 9-4 | Pd:3.0 | CaO:5.0 | 10/1 | 50 | Pt:0.83, Rh:0.167 | 50 |
| Example 9-5 | Pd:3.0 | SrO:5.0 | 10/1 | 50 | Pt:0.83, Rh:0.167 | 50 |
| Example 9-6 | Pd:3.0 | BaO:5.0 | 10/1 | 15 | Pt:0.83, Rh:0.167 | 50 |
| Example 9-7 | Pd:3.0 | BaO:5.0 | 10/1 | 80 | Pt:0.83, Rh:0.167 | 50 |
| Example 9-8 | Pd:3.0 | BaO:5.0 | 10/3 | 50 | Pt:0.83, Rh:0.167 | 50 |

TABLE 20-continued

| | Catalyst in exhaust gas inlet side | | | | Catalyst in exhaust gas outlet side | |
|---|---|---|---|---|---|---|
| | Noble metal* | Alkaline earth metal oxide* | $CeO_2/ZrO_2$** | Total $CeO_2$ and $ZrO_2$* | Noble metal* | $CeO_2$* |
| Example 9-9 | Pd:3.0 | BaO:5.0 | 25/1 | 50 | Pt:0.83, Rh:0.167 | 50 |
| Example 9-10 | Pd:3.0 | MgO:5.0 | 10/1 | 50 | Pt:0.83, Rh:0.167 | 50 |
| Example 9-11 | Pd:1.0 | BaO:5.0 | 10/1 | 50 | Pt:0.83, Rh:0.167 | 50 |
| Example 9-12 | Pd:8.0 | BaO:5.0 | 10/1 | 50 | Pt:0.83, Rh:0.167 | 50 |
| Example 9-13 | Pd:20.0 | BaO:5.0 | 10/1 | 50 | Pt:0.83, Rh:0.167 | 50 |
| Example 9-14 | Pd:3.0 | BaO:5.0 | 10/1 | 50 | Pt:0.83, Rh:0.167 | 50 |
| Example 9-15 | Pd:3.0 | BaO:5.0 | 10/1 | 130 | Pt:0.83, Rh:0.167 | 50 |
| Control 9-1 | Pt:0.83 Ph:0.167 | — | 10/1/ | 50 | Pt:0.83, Rh:0.167 | 50 |
| Control 9-2 | Pd:3.0 | — | 10/1 | 50 | Pt:0.83, Rh:0.167 | 50 |
| Control 9-3 | Pd:3.0 | BaO:5.0 | 1/— | 50 | Pt:0.83, Rh:0.167 | 50 |
| Control 9-4 | Pd:3.0 | — | 1/— | 50 | Pt:0.83, Rh:0.167 | 50 |

*Amount, g, carried per liter of catalyst
**Weight ratio of oxides

TABLE 21

| | Purifying ratio at crossover point (%) | | Purifying ratio at A/F of 14.2(%) | | | Light off temperature (°C.) | | |
|---|---|---|---|---|---|---|---|---|
| | CO—NOx* | HC | CO | HC | NOx | CO | HC | HC |
| Example 9-1 | 92 | 94 | 36 | 70 | 92 | 335 | 344 | 352 |
| Example 9-2 | 94 | 95 | 38 | 72 | 94 | 331 | 340 | 349 |
| Example 9-3 | 87 | 90 | 35 | 68 | 88 | 340 | 346 | 354 |
| Example 9-4 | 91 | 94 | 36 | 70 | 91 | 336 | 347 | 354 |
| Example 9-5 | 92 | 94 | 36 | 70 | 92 | 336 | 334 | 353 |
| Example 9-6 | 87 | 90 | 35 | 68 | 90 | 351 | 360 | 367 |
| Example 9-7 | 93 | 95 | 37 | 71 | 92 | 333 | 342 | 350 |
| Example 9-8 | 92 | 94 | 36 | 70 | 92 | 334 | 343 | 352 |
| Example 9-9 | 92 | 94 | 36 | 69 | 92 | 334 | 344 | 353 |
| Example 9-10 | 86 | 90 | 36 | 67 | 86 | 353 | 362 | 369 |
| Example 9-11 | 86 | 90 | 36 | 60 | 87 | 370 | 375 | 373 |
| Example 9-12 | 94 | 96 | 38 | 73 | 95 | 310 | 319 | 327 |
| Example 9-13 | 98 | 98 | 39 | 75 | 99 | 280 | 298 | 302 |
| Example 9-14 | 92 | 94 | 36 | 70 | 92 | 336 | 343 | 353 |
| Example 9-15 | 94 | 95 | 37 | 72 | 92 | 330 | 339 | 347 |
| Control 9-1 | 85 | 88 | 35 | 53 | 85 | 375 | 380 | 368 |
| Control 9-2 | 80 | 85 | 33 | 60 | 70 | 385 | 390 | 390 |
| Control 9-3 | 76 | 83 | 33 | 60 | 78 | 376 | 375 | 370 |
| Control 9-4 | 73 | 79 | 33 | 58 | 67 | 390 | 395 | 395 |

*Magnitude of purifying ratio at intersection between CO—NOx: CO purifying ratio curve and NOx purifying ratio curve

EXAMPLE 10-1

Catalyst on exhaust gas inlet side

A powder was obtained by impregnating 400 g of an activated alumina ($\gamma$-$Al_2O_3$, average particle diameter 45 $\mu$m, and specific surface area 155 m2/g) with an aqueous nitric acid solution of platinum dinitrodiamine containing 3.33 g of platinum and rhodium nitrate containing 0.667 g of rhodium, drying the product of impregnation, and calicining the dried solid at 400° C. for 2 hours. An aqueous slurry was prepared by wet pulverizing in a ball mill the powder and 200 g of a commercially available cerium oxide ($CeO_2$, specific surface area 149 $m^2$/g). A complete catalyst was produced by immersing 0.5 liter of monolithic carrier of cordierite possessing 400 cells per square inch of cross-sectional area in the slurry, removing the carrier, blowing the wet carrier thereby expelling the excessive slurry remaining within the cells, drying the wet carrier, and calicining the dried carrier.

Catalyst on exhaust gas outlet side

A powder of the amount 200 g was obtained by mixing a commercially available cerium oxide ($CeO_2$, specific surface area 149 $m^2$/g) with an aqueous zirconyl oxynitrate solution in a $CeO_2/ZrO_2$ ratio of 10/1 (the total weight of $CeO_2$ and $ZrO_2$:100 g), drying the resultant mixed solution, and calcining the fired mixture at 500° C. for 1 hour. An aqueous slurry was prepared by wel pulverizing in a ball mill the powder, 400 g of an activated alumina ($\gamma$-$Al_2O_3$, average particle diameter 45 $\mu$m, and specific surface area 155 $m^2$/g), 33.4 g of barium acetate, and an aqueous palladium nitrate solution containing 12 g of palladium A complete catalyst was produced by immersing 0.5 liter of monolithic carrier of cordierite possessing 400 cells per square inch of cross-sectional area in the slurry, removing the carrier, blowing the wet carrier with compressed air thereby expelling the excessive slurry remaining within the cells, drying the wet carrier, and calicining the dried carrier.

EXAMPLE 10-2

A complete catalyst was obtained by following the procedure of Example 10-1, except that the amount of barium acetate in the exhaust gas outlet side catalyst was changed from 33.4 g to 267.2 g.

EXAMPLE 10-3

A complete catalyst was obtained by following the procedure of Example 10-1, except that the amount of barium acetate in the exhaust gas outlet side catalyst was changed from 33.4 g to 1.66 g.

EXAMPLE 10-4

A complete catalyst was obtained by following the procedure of Example 10-1, except that 56.4 g of calcium acetate was used in the place of the barium acetate in the exhaust gas outlet side catalyst

EXAMPLE 10-5

A complete catalyst was obtained by following the procedure of Example 10-1, except that 39.6 g of strontium acetate was used in the place of the barium acetate in the exhaust gas outlet side catalyst.

EXAMPLE 10-6

A complete catalyst was obtained by following the procedure of Example 10-1, except that the $CeO_2/ZrO_2$ ratio in the exhaust gas outlet side catalyst was changed to 10/1 (the total weight of $CeO_2$ and $ZrO_2$:60 g) and the amount of the activated alumina was changed to 540 g.

EXAMPLE 10-7

A complete catalyst was obtained by following the procedure of Example 10-1, except that the $CeO_2/ZrO_2$ ratio in the exhaust gas outlet side catalyst was changed to 10/1 (the total weight of $CeO_2$ and $ZrO_2$:320 g) and the amount of the activated alumina was changed to 280 g.

EXAMPLE 10-8

A complete catalyst was obtained by following the procedure of Example 10-1, except that the $CeO_2/ZrO_2$ ratio in the exhaust gas outlet side catalyst was changed to 10/3 (the total weight of $CeO_2$ and $ZrO_2$:200 g).

EXAMPLE 10-9

A complete catalyst was obtained by following the procedure of Example 10-1, except that the $CeO_2ZrO_2$ ratio in the exhaust gas outlet side catalyst was changed to 25/1 (the total weight of $CeO_2$ and $ZrO_2$:100 g).

EXAMPLE 10-10

A complete catalyst was obtained by following the procedure of Example 10-1, except that 70.6 g of magnesium acetate was used in the place of the barium acetate in the exhaust gas outlet side catalyst.

EXAMPLE 10-11

A complete catalyst was obtained by following the procedure of Example 10-1, except taht an aqueous palladium nitrate solution containing 4 g of palladium was used in the place of the aqueous palladium acetate solution containing 12 g of palladium in the exhaust gas outlet side catalyst.

EXAMPLE 10-12

A complete catalyst was obtained by following the procedure of Example 10-1, except that an aqueous palladium nitrate solution containing 32 g of palladium was used in the place of the aqueous palladium nitrate solution containing 12 g of palladium in the exhaust gas outlet side catalyst.

EXAMPLE 10-13

A complete catalyst was obtained by following the procedure of Example 10-1, except that an aqueous palladium nitrate solution containing 80 g of palladium was used in the place of the aqueous palladium nitrate solution containing 12 g of palladium in the exhaust gas outlet side catalyst.

EXAMPLE 10-14

A complete catalyst was obtained by following the procedure of Example 10-1, except that an aqueous nitric acid solution of platinum dinitrodiamine containing 1.67 g of platinum and palladium nitrate containing 1.67 g of palladium were used in the place of 3.33 g of the platinum in the exhaust gas inlet side catalyst.

EXAMPLE 10-15

A complete catalyst was obtained by following the procedure of Example 10-1, except that a ratio of $CeO_2/ZrO_2$ was changed to 10/1 (total of $CeO_2$ and $ZrO_2$ was 520 g) and an amount of activated alumina was changed to 80 g).

Control 10-1

The procedure of Example 10-1 was repeated, except that the exhaust gas outlet side catalyst was equallized with the exhaust gas inlet side catalyst.

Control 10-2

A complete catalyst was obtained by following the procedure of Example 10-1, except that the use of the barium acetate in the exhaust gas outlet side catalyst was omitted.

Control 10-3

A complete catalyst was obtained by following the procedure of Example 10-1, except that the use of zirconyl oxynitrate in the exhaust gas outlet side catalyst was omitted.

Control 10-4

A complete catalyst was obtained by following the procedure of Example 10-1, except that the use of zirconyl oxynitrate and the use of barium acetate in the exhaust gas outlet side catalyst were omitted.

Supporting amount of each catalytic components of the catalyst thus obtained in Examples and Controls per liter of the catalyst are shown in Table 22.

The catalysts of Examples 10-1 to 10-15 and the catalysts of Controls 10-1 to 10-4 were tested for catalytic activity after an engine durability test in the same manner as in Example 3-21. The results are shown in Table 23.

TABLE 22

|  | Catalyst in exhaust gas inlet side | | Catalyst in exhaust gas outlet side | | | |
|---|---|---|---|---|---|---|
|  | Noble metal* | $CeO_2$*1 | Noble metal* | Alkaline earth metal oxide* | $CeO_2/ZrO_2$** | Total $CeO_2$ and $ZrO_2$* |
| Example 10-1 | Pt:0.83, Rh:0.167 | 50 | Pd:3.0 | BaO:5.0 | 10/1 | 50 |
| Example 10-2 | Pt:0.83, Rh:0.167 | 50 | Pd:3.0 | BaO:40.0 | 10/1 | 50 |
| Example 10-3 | Pt:0.83, Rh:0.167 | 50 | Pd:3.0 | BaO:0.25 | 10/1 | 50 |
| Example 10-4 | Pt:0.83, Rh:0.167 | 50 | Pd:3.0 | caO:5.0 | 10/1 | 50 |
| Example 10-5 | Pt:0.83, Rh:0.167 | 50 | Pd:3.0 | SrO:5.0 | 10/1 | 50 |

TABLE 22-continued

| | Catalyst in exhaust gas inlet side | | Catalyst in exhaust gas outlet side | | | |
|---|---|---|---|---|---|---|
| | Noble metal* | CeO$_2$*1 | Noble metal* | Alkaline earth metal oxide* | CeO$_2$/ZrO$_2$** | Total CeO$_2$ and ZrO$_2$* |
| Example 10-6 | Pt:0.83, Rh:0.167 | 50 | Pd:3.0 | BaO:5.0 | 10/1 | 15 |
| Example 10-7 | Pt:0.83, Rh:0.167 | 50 | Pd:3.0 | BaO:5.0 | 10/1 | 80 |
| Example 10-8 | Pt:0.83, Rh:0.167 | 50 | Pd:3.0 | BaO:5.0 | 10/3 | 50 |
| Example 10-9 | Pt:0.83, Rh:0.167 | 50 | Pd:3.0 | BaO:5.0 | 25/1 | 50 |
| Example 10-10 | Pt:0.83, Rh:0.167 | 50 | Pd:3.0 | MgO:5.0 | 10/1 | 50 |
| Example 10-11 | Pt:0.83, Rh:0.167 | 50 | Pd:1.0 | BaO:5.0 | 10/1 | 50 |
| Example 10-12 | Pt:0.83, Rh:0.167 | 50 | Pd:8.0 | BaO:5.0 | 10/1 | 50 |
| Example 10-13 | Pt:0.83, Rh:0.167 | 50 | Pd:20.0 | BaO:5.0 | 10/1 | 50 |
| Example 10-14 | Pt:0.83, Pd:0.83 Rh:0.167 | 50 | Pd:3.0 | BaO:5.0 | 10/1 | 50 |
| Example 10-15 | Pt:0.83, Rh:0.167 | 50 | Pd:3.0 | BaO:5.0 | 10/1 | 130 |
| Control 10-1 | Pt:0.83, Rh:0.167 | 50 | Pt:0.83 Ph:0.167 | — | 1/— | 50 |
| Control 10-2 | Pt:0.83, Rh:0.167 | 50 | Pd:3.0 | — | 1/— | 50 |
| Control 10-3 | Pt:0.83, Rh:0.167 | 50 | Pd:3.0 | BaO:5.0 | 1/— | 50 |
| Control 10-4 | Pt:0.83, Rh:0.167 | 50 | Pd:3.0 | — | 1/— | 50 |

*Amount, g. carried per liter of catalyst
**Weight ratio of oxides

TABLE 23

| | Purifying ratio at crossover point (%) | | Purifying ratio 14.2(%) | | | Light off temperature (°C.) | | |
|---|---|---|---|---|---|---|---|---|
| | CO—NO | HC | CO | HC | NO | CO | HC | NO |
| Example 10-1 | 92 | 93 | 35 | 65 | 92 | 336 | 346 | 353 |
| Example 10-2 | 92 | 93 | 36 | 66 | 92 | 335 | 344 | 352 |
| Example 10-3 | 85 | 88 | 33 | 62 | 86 | 341 | 347 | 355 |
| Example 10-4 | 90 | 93 | 35 | 65 | 90 | 336 | 346 | 354 |
| Example 10-5 | 91 | 93 | 35 | 65 | 91 | 334 | 347 | 354 |
| Example 10-6 | 86 | 89 | 34 | 63 | 88 | 353 | 362 | 369 |
| Example 10-7 | 92 | 94 | 36 | 66 | 91 | 335 | 344 | 351 |
| Example 10-8 | 91 | 93 | 34 | 65 | 92 | 335 | 343 | 352 |
| Example 10-9 | 90 | 91 | 34 | 63 | 90 | 335 | 344 | 354 |
| Example 10-10 | 83 | 87 | 33 | 60 | 87 | 358 | 369 | 370 |
| Example 10-11 | 84 | 88 | 33 | 58 | 86 | 372 | 378 | 376 |
| Example 10-12 | 93 | 94 | 37 | 68 | 93 | 311 | 319 | 327 |
| Example 10-13 | 98 | 98 | 39 | 72 | 99 | 278 | 296 | 300 |
| Example 10-14 | 92 | 92 | 34 | 65 | 92 | 334 | 347 | 352 |
| Example 10-15 | 93 | 95 | 36 | 67 | 92 | 332 | 341 | 348 |
| Control 10-1 | 85 | 88 | 35 | 53 | 85 | 375 | 380 | 368 |
| Control 10-2 | 82 | 84 | 33 | 56 | 70 | 390 | 395 | 395 |
| Control 10-3 | 76 | 82 | 33 | 56 | 77 | 378 | 384 | 371 |
| Control 10-4 | 74 | 79 | 33 | 56 | 64 | 393 | 398 | 398 |

What is claimed is:

1. An exhaust gas purifying catalyst for simultaneous removal of carbon monoxide, hydrocarbons and nitrogen oxides from an exhaust gas from an internal-combustion engine, having carried on a monolithic carrier a mixture comprising a rhodium free catalytically active component comprising 0.5 to 30 g of palladium,
0.1 to 50 g of an alkaline earth metal oxide,
10 g to 150 g of cerium oxide,
0.1 to 50 g of zirconium oxide and
10 to 300 g of an activated alumina, per liter of catalyst wherein at least part of said cerium oxide and said zirconium oxide are present in the form of a composite or solid solution, and wherein said composite or solid solution are formed of at least part of said cerium oxide and said zirconium oxide form crystals having diameters in the range of not more than 250 Å after 10 hours calcining in the air at 900° C.

2. An exhaust gas purifying catalyst for simultaneous removal of carbon monoxide, hydrocarbons and nitrogen oxides from an exhaust gas from an internal combustion engine, having carried on a monolithic carrier a mixture comprising a rhodium free catalytically active component comprising, 0.5 to 30 g palladium,
0.1 to 50 g of an alkaline earth metal oxide,
10 g to 150 g of cerium oxide, and
0.1 to 50 g of zirconium oxide and
10 g to 300 g of an activated alumina, per liter of catalyst,
at least part of said cerium oxide and zirconium oxide being present in the form of a composite or solid solution due to being calcined for 10 hours in air at 900° C.,
said composite or solid solution exhibiting oxygen consumption at 400° C. after 30 minutes reduction with hydrogen at 500° C. in the range of not less than $5 \times 10^{-5}$ mol, as O$_2$, per g of said cerium oxide.

3. A catalyst according to claim 1, wherein the ratio of said cerium oxide to said zirconium oxide (weight ratio as oxides) is in the range of from 100:2 to 100:60.

4. A catalyst according to claim 2, wherein the ratio of said cerium oxide to said zirconium oxide is in the range of from 100:2 to 100:60 by weight as oxides.

5. A catalyst according to claim 1, wherein said composite or solid solution formed of at least part of said cerium oxide and said zirconium oxide, on being calcined for 10 hours in the air at 900° C., exhibits oxygen consumption at 400° C. after 30 minutes reduction with hydrogen at 500° C. in the range of not less than $5 \times 10^{-5}$ mol (as $_2$) per g of said cerium oxide.

6. A catalyst according to claim 1, wherein said alkaline earth metal is at least one member selected from the group consisting of beryllium, magnesium, calcium, strontium and barium.

7. A catalyst according to claim 1, wherein said alkaline earth metal is at least one member selected from the group consisting of calcium, strontium, and barium.

8. A catalyst according to claim 1, wherein said activated alumina has a specific surface area in the range of from 10 to 400 m$^2$/g.

9. A catalyst according to claim 1, wherein the amount of palladium is in the range of from 0.25 to 25 g, that of said alkaline earth metal oxide in the range of from 0.5 to 40 g, that of said cerium oxide in the range of from 20 to 140 g, that of said zirconium oxide in the range of from 1 to 50 g, and that of said activated alumina in the range of 10 to 250 g per liter of catalyst and the ratio of said cerium oxide to said zirconium oxide (weight ratio as oxides) is in the range of from 100:4 to 100:40.

10. A catalyst according to claim 2, wherein said alkaline earth metal is at least one member selected from the group consisting of berylium, magnesium, calcium, strontium, and barium.

11. A catalyst according to claim 1, wherein a catalyst component comprising (a) palladium and an alkaline earth metal oxide, (b) a cerium oxide having carried thereon zirconium and lanthanum, and (c) an activated alumina oxide having carried thereon cerium and zirconium is deposited on a monolithic carrier.

12. A catalyst according to claim 1, wherein a lanthanum oxide is further incorporated as a catalytically active component in an amount in the range of from 0.1 to 50 g per liter of catalyst.

13. A catalyst according to claim 1, wherein the catalyst therein comprises at least one number of the group consisting of a titanium oxide in an amount in the range of from 1 to 150 and a silicon oxide in an amount in the range of from 0.05 to 50 g per liter of catalyst.

14. An exhaust gas purifying catalyst for simultaneous removal of carbon monoxide, hydrocarbons and nitrogen oxides from an exhaust gas from an internal-combustion engine, having carried on a monolithic carrier a mixture comprising a rhodium free catalytically active component comprising 0.5 to 30 g of palladium
0.1 to 50 g of an alkaline earth metal oxide,
10 g to 150 g of cerium oxide,
0.1 to 50 g of zirconium oxide and
10 to 300 g of an activated alumina, per liter of catalyst, further comprising at least one member of the group consisting of the oxides of at least one metal selected from the group consisting of iron, cobalt, and nickel in an amount in the range of from 0.1 to 20 per liter of catalyst.

* * * * *